United States Patent
Oike

(10) Patent No.: US 10,616,541 B2
(45) Date of Patent: Apr. 7, 2020

(54) IMAGE PROJECTION SYSTEM, PROJECTOR, AND METHOD FOR CONTROLLING IMAGE PROJECTION SYSTEM

(71) Applicant: SEIKO EPSON CORPORATION, Tokyo (JP)

(72) Inventor: Takumi Oike, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/164,956

(22) Filed: Oct. 19, 2018

(65) Prior Publication Data
US 2019/0124307 A1    Apr. 25, 2019

(30) Foreign Application Priority Data
Oct. 20, 2017  (JP) ................................ 2017-203340

(51) Int. Cl.
H04N 9/31    (2006.01)

(52) U.S. Cl.
CPC ......... H04N 9/3182 (2013.01); H04N 9/3147 (2013.01); H04N 9/3194 (2013.01)

(58) Field of Classification Search
CPC ... H04N 9/3147; H04N 9/3194; H04N 9/2182
See application file for complete search history.

(56) References Cited

U.S. PATENT DOCUMENTS

| | | | |
|---|---|---|---|
| 6,573,923 B2* | 6/2003 | Hevenor | B41J 25/316 347/215 |
| 6,717,625 B1* | 4/2004 | Thielemans | H04N 9/31 348/745 |
| 7,724,206 B2* | 5/2010 | Saito | H04N 9/3194 345/1.3 |
| 7,857,461 B2* | 12/2010 | Kondo | H04N 5/74 353/121 |

(Continued)

FOREIGN PATENT DOCUMENTS

| | | |
|---|---|---|
| JP | 2002-116500 A | 4/2002 |
| JP | 2009-237051 A | 10/2009 |

(Continued)

*Primary Examiner* — Brian P Yenke
(74) *Attorney, Agent, or Firm* — Oliff PLC

(57) ABSTRACT

An image projection system includes a first projector and a second projector. The first projector includes a first projection section that projects a first image and a first imaging section that captures an image of an area including the first image. The second projector includes a second projection section that projects a second image and a second imaging section that captures an image of an area including the second image. The image projection system further includes a computation section that determines first luminance adjustment information used to adjust the luminance of the first image and second luminance adjustment information used to adjust the luminance of the second image based on the luminance distribution of the first image determined from the image captured by the first imaging section and the luminance distribution of the second image determined from the image captured by the second imaging section.

12 Claims, 13 Drawing Sheets

(56) References Cited

U.S. PATENT DOCUMENTS

| | | | | |
|---|---|---|---|---|
| 7,907,790 | B2* | 3/2011 | Inazumi | G09G 3/001 353/30 |
| 8,045,006 | B2* | 10/2011 | Miceli | H04N 9/3194 348/189 |
| 9,191,638 | B2* | 11/2015 | Ouchi | H04N 9/3182 |
| 9,292,945 | B2* | 3/2016 | Kubota | G06T 11/003 |
| 9,330,479 | B2* | 5/2016 | Suzuki | G06T 11/001 |
| 9,497,432 | B2* | 11/2016 | Okamoto | H04N 9/3147 |
| 9,497,447 | B2* | 11/2016 | Green | G01J 3/506 |
| 9,554,105 | B2* | 1/2017 | Mori | H04N 9/3185 |
| 9,625,804 | B2* | 4/2017 | Kim | G03B 37/04 |
| 9,628,767 | B2* | 4/2017 | Cho | G03B 21/147 |
| 9,761,158 | B2* | 9/2017 | Ouchi | G09G 3/002 |
| 9,769,469 | B2* | 9/2017 | Ooi | G06T 7/0002 |
| 9,883,153 | B2* | 1/2018 | Naganuma | G09G 5/10 |
| 9,906,761 | B2* | 2/2018 | Mori | H04N 9/3185 |
| 9,930,307 | B1* | 3/2018 | Kursula | H04N 17/002 |
| 9,961,317 | B2* | 5/2018 | Morrison | H04N 9/3147 |
| 10,038,880 | B2* | 7/2018 | Nishida | H04N 9/3182 |
| 10,101,957 | B2* | 10/2018 | Yamamoto | G06F 3/1431 |
| 10,148,923 | B2* | 12/2018 | Ohira | G09G 5/00 |
| 10,148,924 | B2* | 12/2018 | Wada | H04N 9/3179 |
| 10,205,920 | B2* | 2/2019 | Shimizu | G03B 21/2006 |
| 10,205,921 | B2* | 2/2019 | Chida | G06T 11/60 |
| 10,218,948 | B2* | 2/2019 | Ouchi | H04N 9/3182 |
| 10,218,949 | B2* | 2/2019 | Naganuma | H04N 9/31 |
| 10,250,855 | B2* | 4/2019 | Tanaka | H04N 9/3147 |
| 10,341,626 | B2* | 7/2019 | Oike | H04N 9/3147 |
| 10,431,131 | B2* | 10/2019 | Ano | G09G 3/002 |
| 2001/0022651 | A1* | 9/2001 | Kubota | G03B 21/10 353/94 |
| 2002/0024640 | A1* | 2/2002 | Ioka | G03B 21/13 353/94 |
| 2002/0041364 | A1* | 4/2002 | Ioka | H04N 9/3147 353/69 |
| 2002/0159035 | A1* | 10/2002 | Koyama | H04N 5/44513 353/31 |
| 2004/0227908 | A1* | 11/2004 | Wada | H04N 5/74 353/94 |
| 2006/0181685 | A1* | 8/2006 | Hasegawa | G03B 37/04 353/69 |
| 2008/0100806 | A1* | 5/2008 | Inazumi | G09G 3/001 353/31 |
| 2008/0259233 | A1* | 10/2008 | Krijn | H04N 13/302 349/15 |
| 2009/0213335 | A1* | 8/2009 | Kondo | G03B 37/04 353/30 |
| 2010/0097444 | A1* | 4/2010 | Lablans | G03B 35/00 348/46 |
| 2011/0234920 | A1* | 9/2011 | Nelson | H04N 9/3147 348/745 |
| 2011/0292080 | A1* | 12/2011 | Oka | H04N 9/3179 345/634 |
| 2012/0075878 | A1* | 3/2012 | Sato | B60R 1/00 362/538 |
| 2013/0215138 | A1* | 8/2013 | Suzuki | G06T 11/001 345/593 |
| 2013/0342576 | A1* | 12/2013 | Kubota | G06T 11/003 345/634 |
| 2014/0071409 | A1* | 3/2014 | Nakashin | G03B 21/53 353/69 |
| 2014/0104581 | A1* | 4/2014 | Yoshimura | G03B 21/26 353/30 |
| 2014/0104582 | A1* | 4/2014 | Mori | H04N 9/3185 353/30 |
| 2014/0225909 | A1 | 8/2014 | Ouchi | |
| 2014/0313423 | A1* | 10/2014 | Johnson | G03B 21/13 348/745 |
| 2014/0354674 | A1* | 12/2014 | Okamoto | G09G 5/02 345/590 |
| 2015/0138222 | A1* | 5/2015 | Imaizumi | H04N 9/3182 345/589 |
| 2015/0195424 | A1* | 7/2015 | Mizushiro | H04N 9/3147 345/600 |
| 2016/0112689 | A1* | 4/2016 | Okamoto | H04N 9/3147 348/745 |
| 2016/0261831 | A1* | 9/2016 | Coleman | H04N 9/3147 |
| 2017/0070711 | A1* | 3/2017 | Grundhofer | H04N 9/3147 |
| 2017/0103687 | A1* | 4/2017 | Ano | G09G 5/14 |
| 2017/0127027 | A1 | 5/2017 | Naganuma | |
| 2017/0127028 | A1* | 5/2017 | Oike | H04N 9/3147 |
| 2017/0163948 | A1* | 6/2017 | Morisawa | G06F 3/1446 |
| 2017/0208309 | A1* | 7/2017 | Oike | H04N 9/3147 |
| 2017/0310937 | A1* | 10/2017 | Wada | H04N 9/3179 |
| 2018/0003949 | A1* | 1/2018 | Kawahara | G02B 26/08 |
| 2018/0013995 | A1* | 1/2018 | Mizushiro | H04N 9/3185 |
| 2018/0020199 | A1* | 1/2018 | Yamamoto | G06F 3/1431 |
| 2018/0139422 | A1* | 5/2018 | Moule | H04N 9/3182 |
| 2018/0143008 | A1* | 5/2018 | Morrison | H04N 5/247 |
| 2018/0151098 | A1* | 5/2018 | Tomita | G09G 3/002 |
| 2018/0160086 | A1* | 6/2018 | Naganuma | H04N 9/31 |
| 2018/0300017 | A1* | 10/2018 | Wakimoto | G06F 3/0421 |
| 2018/0343426 | A1* | 11/2018 | Wada | H04N 9/3182 |
| 2019/0043444 | A1* | 2/2019 | Yasuda | G09G 5/026 |
| 2019/0104290 | A1* | 4/2019 | Lin | H04N 9/3185 |
| 2019/0104291 | A1* | 4/2019 | Lin | H04N 9/3185 |
| 2019/0121224 | A1* | 4/2019 | Edwards | G06T 7/521 |
| 2019/0130541 | A1* | 5/2019 | Kudo | G09G 3/002 |
| 2019/0141303 | A1* | 5/2019 | Naganuma | H04N 9/31 |
| 2019/0268579 | A1* | 8/2019 | Oike | H04N 9/3185 |
| 2019/0373228 | A1* | 12/2019 | Okada | H04N 9/312 |

FOREIGN PATENT DOCUMENTS

| | | |
|---|---|---|
| JP | 2014-153627 A | 8/2014 |
| JP | 2017-083672 A | 5/2017 |
| JP | 2017-129701 A | 7/2017 |
| JP | 2017-129703 A | 7/2017 |
| JP | 2017-129704 A | 7/2017 |
| JP | 2017-129728 A | 7/2017 |
| JP | 2017-129739 A | 7/2017 |
| JP | 2017-130779 A | 7/2017 |
| JP | 2017-212516 A | 11/2017 |
| JP | 2018-032922 A | 3/2018 |
| JP | 2018-032923 A | 3/2018 |
| JP | 2018-129600 A | 8/2018 |
| WO | 2016/002511 A1 | 1/2016 |

* cited by examiner

IMAGE PROJECTION SYSTEM, PROJECTOR, AND METHOD FOR CONTROLLING IMAGE PROJECTION SYSTEM

CROSS-REFERENCE

The entire disclosure of Japanese Patent Application No. 2017-203340, filed Oct. 20, 2017 is expressly incorporated by reference herein.

BACKGROUND

1. Technical Field

The present invention relates to an image projection system, a projector, and a method for controlling the image projection system.

2. Related Art

There has been a known image projection system that connects images projected from a plurality of projectors to each other on a projection surface to project the resultant single large-screen image. In the image projection system, end portions of the images are caused to overlap with each other, and the luminance of each of the overlapping areas is so adjusted that changes in luminance on the projection surface do not visually stand out (see JP-A-2002-116500, for example).

The image projection/display apparatus disclosed in JP-A-2002-116500 creates a state in which a plurality of projectors project test images in a projection area of a screen and captures the test images via an image capturing section so provided as to be external to the projectors. Further, the image projection/display apparatus calculates correction data for correction of an input image based on the test images captured by the image capturing section in such a way that target brightness is achieved across the entire projection area including the overlapping areas where images projected by the plurality of projectors overlap with each other.

A projection surface on which a projector projects an image has reflection characteristics, and the intensity of light reflected off the projection surface varies depending on the observation position where a viewer views the projection surface. Therefore, even when an image of the projection surface is captured by an image capturing section incorporated in the projector and the luminance of an image projected on the projection surface is adjusted, optimum luminance is not achieved in some cases in the position of the viewer who visually recognizes the image projected by the projector when the position of the image capturing section differs from the position of the viewer.

SUMMARY

An advantage of some aspects of the invention is to preferably adjust the luminance of images projected by a plurality of projectors on a projection surface by using image capturing sections incorporated in the projectors.

An aspect of the invention is directed to an image projection system including a first projector and a second projector. The first projector includes a first projection section that projects a first image on a projection surface and a first imaging section that captures an image of an area including the first image projected by the first projection section. The second projector includes a second projection section that projects a second image on the projection surface and a second imaging section that captures an image of an area including the second image projected by the second projection section. The image projection system further includes a computation section that determines first luminance adjustment information, in accordance with which the first projector adjusts luminance of the first image, and second luminance adjustment information, in accordance with which the second projector adjusts luminance of the second image, based on a luminance distribution of the first image determined from the image captured by the first imaging section and a luminance distribution of the second image determined from the image captured by the second imaging section.

According to the configuration described above, an image of the range including the first image projected by the first projection section is captured by the first imaging section and the luminance distribution across the first image is determined from the captured image, and an image of the area including the second image projected by the second projection section is captured by the second imaging section and the luminance distribution across the second image is determined from the captured image. The luminance distributions across the first and second images can therefore be determined with precision. In particular, in a case where the reflection characteristic of the projection surface that the luminance of light reflected off the projection surface in roughly the same direction as the direction in which the light is incident on the projection surface is roughly equal to the luminance of light incident on the projection surface at an angle of incidence of 0 degrees and reflected off the projection surface at an angle of reflection of 0 degrees, a luminance distribution close to the luminance distribution in the case of front projection can be obtained. An error of an imaging result resulting from the reflection characteristic of the projection surface can therefore be suppressed, whereby the luminance of images projected on the projection surface by a plurality of projectors can be preferably adjusted by using the imaging sections incorporated in the projectors.

In the aspect of the invention, the computation section may determine the first luminance adjustment information and the second luminance adjustment information for adjustment of luminance of an overlapping area where the first image and the second image overlap each other on the projection surface.

According to the configuration described above, the first luminance adjustment information and the second luminance adjustment information, which are used to adjust the luminance of the overlapping area, can be determined.

In the aspect of the invention, the computation section may determine the first luminance adjustment information and the second luminance adjustment information representing a luminance change corresponding to the overlapping area.

According to the configuration described above, the first luminance adjustment information, which is used to adjust the luminance of an area that is part of the first image and corresponds to the overlapping area, and the second luminance adjustment information, which is used to adjust the luminance of an area that is part of the second image and corresponds to the overlapping area, can be determined.

In the aspect of the invention, the first projector may include a first image processing section that adjusts the luminance of the first image projected by the first projection section based on the first luminance adjustment information determined by the computation section, and the second projector may include a second image processing section that adjusts the luminance of the second image projected by the second projection section based on the second luminance adjustment information determined by the computation section.

According to the aspect of the invention, the first projector can adjust the luminance of the first image based on the first luminance adjustment information. Similarly, the second projector can adjust the luminance of the second image based on the second luminance adjustment information.

In the aspect of the invention, the first projector may include the computation section.

According to the configuration described above, the first projector can determine the first luminance adjustment information and the second luminance adjustment information.

Another aspect of the invention is directed to a projector connected to an external projector, the projector including a projection section that projects a first image, an imaging section that captures an image of an area including the first image projected by the projection section, an acquisition section that acquires a captured image produced by the external projector and containing an area including a second image projected by the external projector, and a computation section that determines first luminance adjustment information, in accordance with which the projector adjusts luminance of the first image, and second luminance adjustment information, in accordance with which the external projector adjusts luminance of the second image, based on a luminance distribution of the first image determined from the captured image produced by the imaging section and a luminance distribution of the second image determined from the captured image acquired by the acquisition section.

According to the configuration described above, an image of the area including the first image projected by the projection section is captured by the imaging section, and the luminance distribution across the first image is determined from the captured image. An image of the area including the second image projected by the external projector is captured by the external projector, and the luminance distribution across the second image is determined from the captured image. The luminance distributions across the first and second images can therefore be determined with precision. In particular, in the case where the reflection characteristic of a projection surface that the luminance of light reflected off the projection surface in roughly the same direction as the direction in which the light is incident on the projection surface is roughly equal to the luminance of light incident on the projection surface at the angle of incidence of 0 degrees and reflected off the projection surface at the angle of reflection of 0 degrees, a luminance distribution close to the luminance distribution in the case of front projection can be obtained. An error of an imaging result resulting from the reflection characteristic of the projection surface can therefore be suppressed, whereby the luminance of images projected on the projection surface by a plurality of projectors can be preferably adjusted by using the imaging sections incorporated in the projectors.

Another aspect of the invention is directed to a method for controlling an image projection system including a first projector and a second projector, the method including causing the first projector to project a first image and causing the second projector to project a second image, causing the first projector to capture an image of an area including the first image projected by the first projector, causing the second projector to capture an image of an area including the second image projected by the second projector, and determining first luminance adjustment information, in accordance with which the first projector adjusts luminance of the first image, and second luminance adjustment information, in accordance with which the second projector adjusts luminance of the second image, based on a luminance distribution of the first image determined from the captured image produced by the first projector and a luminance distribution of the second image determined from the captured image produced by the second projector.

According to the configuration described above, an image of the area including the first image projected by the first projector is captured by the first projector, and the luminance distribution across the first image is determined from the captured image. An image of the area including the second image projected by the second projector is captured by the second projector, and the luminance distribution across the second image is determined from the captured image. The luminance distributions across the first and second images can therefore be determined with precision. In particular, in a case where the reflection characteristic of a projection surface that the luminance of light reflected off the projection surface in roughly the same direction as the direction in which the light is incident on the projection surface is roughly equal to the luminance of light incident on the projection surface at the angle of incidence of 0 degrees and reflected off the projection surface at the angle of reflection of 0 degrees, a luminance distribution close to the luminance distribution in the case of front projection can be obtained. An error of an imaging result resulting from the reflection characteristic of the projection surface can therefore be suppressed, whereby the luminance of images projected on the projection surface by a plurality of projectors can be preferably adjusted by using the imaging sections incorporated in the projectors.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
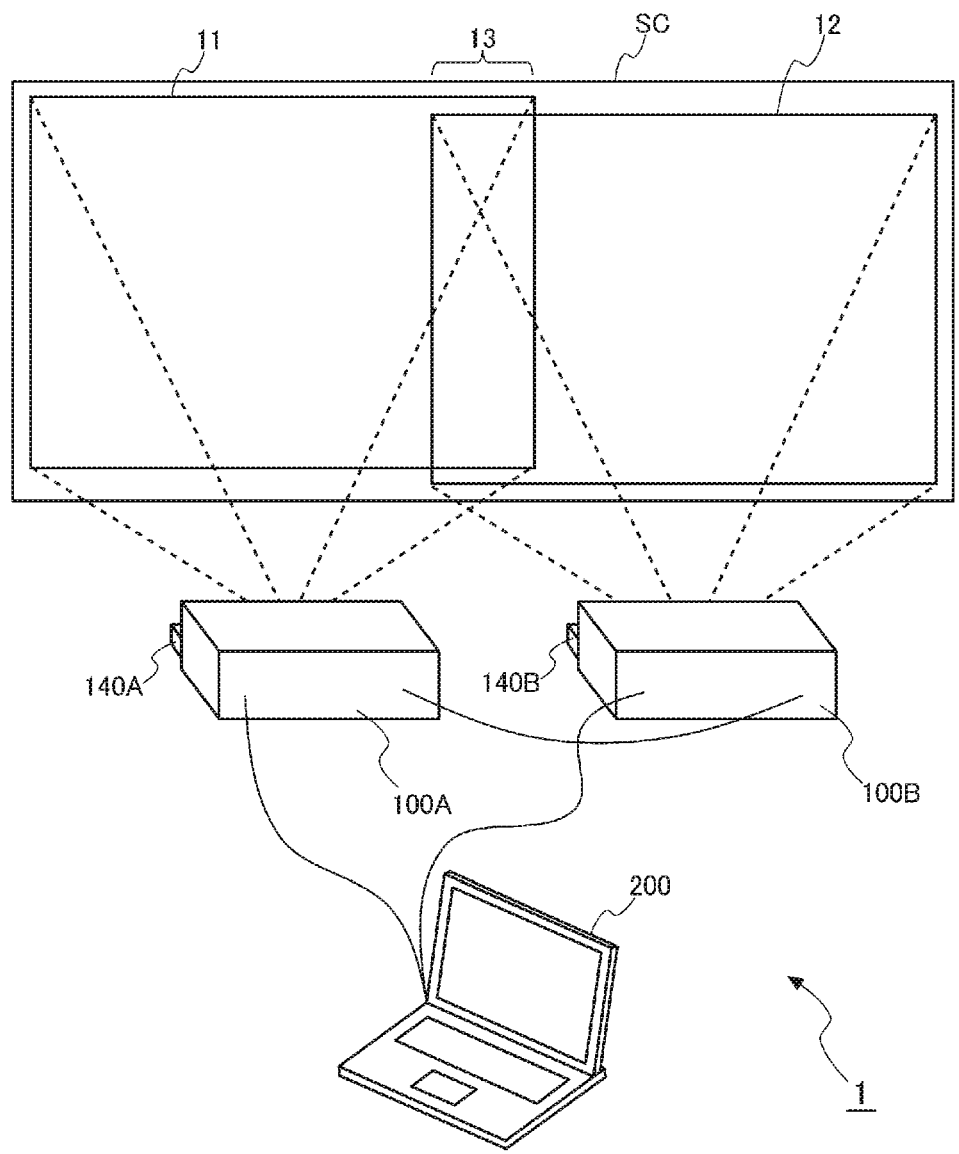
FIG. 1 is a system configuration diagram of an image projection system.

Embodiments according to the invention will be described below with reference to the drawings. FIG. 1 is a system configuration diagram of an image projection system 1. The image projection system 1 includes a plurality of projectors 100 and an image supplying apparatus 200, which supplies the plurality of projectors 100 with image data.

FIG. 1 shows a case in which the image projection system 1 includes two projectors 10, a projector 100A and a projector 100B, but the number of projectors 100 is not limited to two and may instead be three or greater. Further, in the following description, in a case where the projectors 100A and 100B do not particularly need to be distinguished from each other, the projectors 100A and 100B are called projector 100. The projector 100A corresponds to the "first projector" and the "projector" in an aspect of the invention. The projector 100B corresponds to the "second projector" and the "external projector" in an aspect of the invention.

The projectors 100A and 100B are disposed in front of a screen SC, which is a projection surface, and disposed side by side in the horizontal direction (lateral direction) of the screen SC. In the present embodiment, the projector 100A is disposed on the left when viewed in the direction toward the screen SC and projects an image in a projection area 11, which is a left area of the screen SC. The projector 100B is disposed on the right when viewed in the direction toward the screen SC and projects an image in a projection area 12, which is a right area of the screen SC. The present embodiment will be described with reference to a case where an image is projected on the screen SC, which is formed of a flat surface and serves as the projection surface, but the projection surface may instead be a fixed flat surface, such as a wall surface. The screen SC may still instead be a curtain-like screen, such as an suspended screen and a standing screen.

The arrangement of the projectors 100 is not limited to the arrangement in which the projectors 100A and 100B are disposed side by side in the horizontal direction of the screen SC. For example, the arrangement of the projectors 100 may be a matrix arrangement in which four projectors 100 are arranged in longitudinal two columns and two lateral rows or an arrangement in which three projectors are layered on each other in the longitudinal direction.

The image projection system 1 performs tiling projection in which images projected by the projectors 100A and 100B are combined with each other on the screen SC so that a single large-screen image is projected. In the tiling projection, the projection areas 11 and 12 are so adjusted that images projected by the projectors 100A and 100B partially overlap with each other to make the boundary between the projected images less visually standing out. The area of the screen SC where an image projected by the projector 100A overlaps with an image projected by the projector 100B is called an overlapping area 13. The overlapping area 13 corresponds to the "overlapping area" in an aspect of the invention.

The present embodiment will be described with reference to a case where the projector 100A operates as a master projector and the projector 100B operates as a slave projector. The projector 100A, which is the master projector, calculates luminance adjustment information used to adjust the luminance of an image projected on the screen SC and outputs the calculated luminance adjustment information to the projector 100B, which is the slave projector.

The projectors 100A and 100B are connected to the image supplying apparatus 200 and project images based on the image data supplied from the image supplying apparatus 200 on the screen SC.

The image supplying apparatus 200 divides the image data to be projected as a single image plane on the screen SC (hereinafter referred to as raw image data) to produce image data to be projected by the projector 100A and image data to be projected by the projector 100B. The image data produced by dividing the raw image data is called divided image data. The image supplying apparatus 200 transmits the divided image data to be projected by the projector 100A to the projector 100A and the divided image data to be projected by the projector 100B to the projector 100B.

The image supplying apparatus 200 can, for example, be a notebook personal computer (PC), a desktop PC, a tablet terminal, a smartphone, or a personal digital assistant (PDA). The image supplying apparatus 200 may instead, for example, be a video reproducing apparatus, a digital versatile disk (DVD) player, a Blu-ray disk player, a hard disk recorder, a TV tuner, a set-top box of a cable television (CATV), or a video game console.

Figure 2:
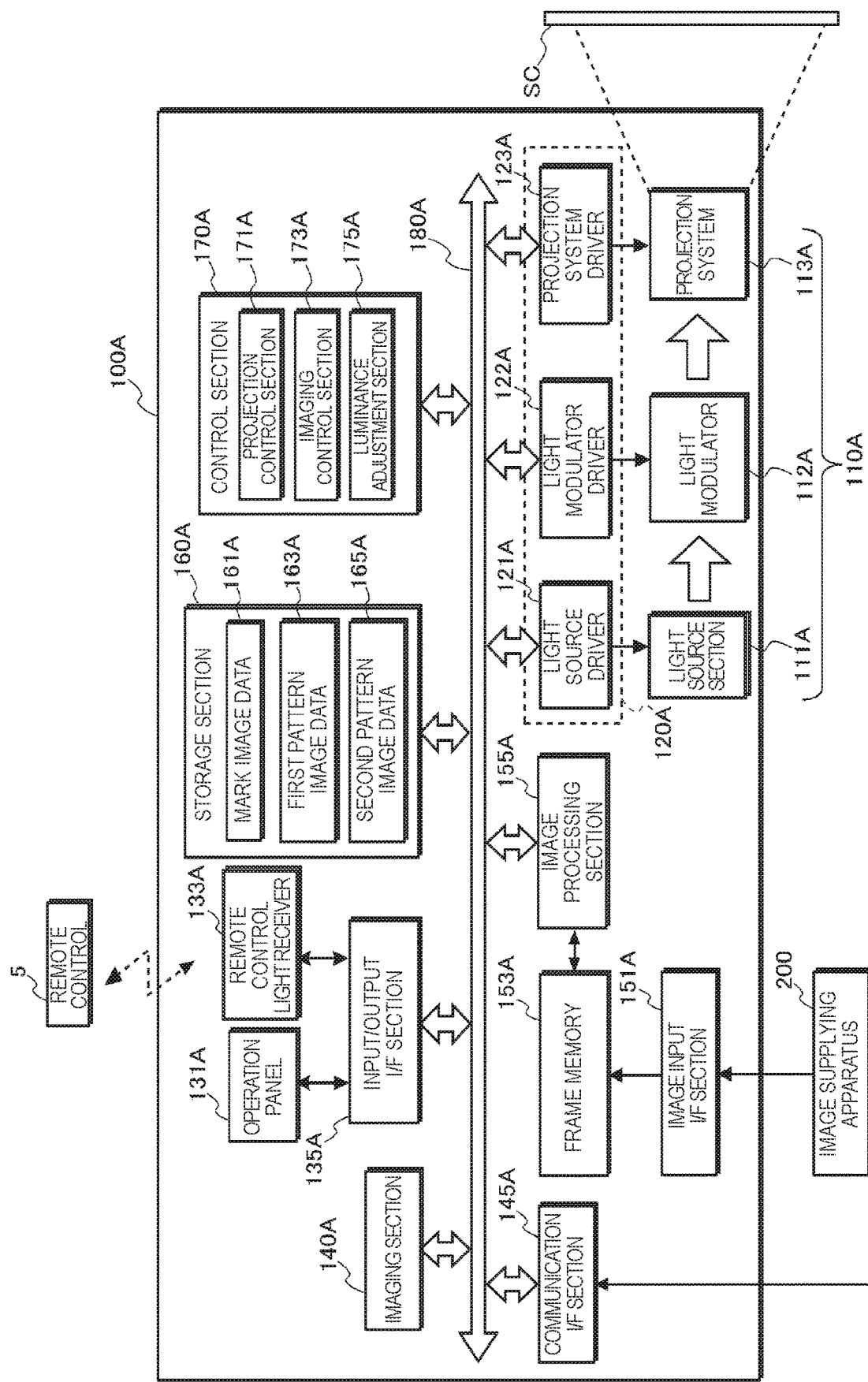
FIG. 2 is a configuration diagram of each projector.

FIG. 2 is a configuration diagram of the projector 100A. The projectors 100A and 100B have roughly the same configuration. The configuration of the projector 100A will therefore be described as the configuration of the projectors 100, and no description will be made of the configuration of the projector 100B.

In the following description, to distinguish the configuration of the projector 100A from the configuration of the projector 100B, the name of each component of the projector 100A has a suffix "A", and the name of each component of the projector 100B has a suffix "B". For example, a control section of the projector 100A is called a "control section 170A," and a control section of the projector 100B is called a "control section 170B."

The projector 100A includes an image input I/F section 151A. The image input I/F section 151A includes a cable-connecting connector and an interface circuit (neither of them is shown).

The image input I/F section 151A receives a signal transmitted from the image supplying apparatus 200. The image input I/F section 151A extracts image data and sync signals (vertical sync signal and horizontal sync signal) contained in the received signal. The image input I/F section 151A outputs the extracted image data to a frame memory 153A, causes the frame memory 153A to store the image data, and outputs the sync signals to an image processing section 155A and a control section 170A. The image processing section 155A processes the image data in synchronization with the sync signals. The control section 170A controls the action of each portion that forms the projector 100A based on the sync signals.

The interface of the image input I/F section 151A can, for example, be any of the following interfaces.

The interface can be an interface capable of transmitting a video signal and a voice signal in the form of digital signals, for example, an interface compliant with HDMI {registered trademark (High-Definition Multimedia Interface)}, Displayport, MHL (Mobile High-definition Link, registered trademark), HDBaseT (registered trademark), Thunderbolt (registered trademark), USB Type-C, or 3G-SDI (Serial Digital Interface). The interface can instead be an interface for data communication, such as an interface compliant with Ethernet (registered trademark), IEEE 1394, and USB. Further, the image supplying apparatus 200 and the projector 100A may be provided with an analog video terminal, such as the RCA terminal, the VGA terminal, the S terminal, or the D terminal, to transmit and receive an analog video signal.

The projector 100A includes a projection section 110A, which forms an optical image and projects the optical image on the screen SC, and a driver 120A, which drives the projection section 110A. The projection section 110A includes a light source section 111A, a light modulator 112A, and a projection system 113A. The driver 120A includes a light source driver 121A, a light modulator driver 122A, and a projection system driver 123A. The projection section 110A corresponds to the "first projection section" and the "projection section" in an aspect of the invention. The projection section 110B of the projector 100B corresponds to the "second projection section" in an aspect of the invention.

The light source section 111A includes a light source, such as, a xenon lamp, an ultrahigh-pressure mercury lamp, a light emitting diode (LED), or a laser light source. The light source section 111A may further include a reflector and an auxiliary reflector that guide light emitted by the light source to the light modulator 112A. The light source section 111A may further include a lens group for enhancing the optical characteristics of projected light, a polarizer, a light adjusting element that is disposed in the path leading to the light modulator 112A and attenuates the amount of the light emitted by the light source, or any other component (none of the components described above is shown).

The light source section 111A is driven by the light source driver 121A. The light source driver 121A is connected to a bus 180A and turns on and off the light source section 111A under the control of the control section 170A (which will be described later), which is also connected to the bus 180A.

The light modulator 112A includes three liquid crystal panels corresponding, for example, to the three primary colors of light, R, G, and B. The light outputted by the light source section 111A is separated by a dichroic mirror, a reflection mirror, a relay lens, and other components (none of them is shown) into RGB three color light fluxes and incident on the liquid crystal panels for the corresponding colors. The three liquid crystal panels are each a transmissive liquid crystal panel and modulate light passing therethrough to produce image light. The modulated image light fluxes having passed through the liquid crystal panels are combined with one another by a light combining system, such as a cross dichroic prism, and the combined light is directed to the projection system 113A.

The light modulator 112A is driven by the light modulator driver 122A. The light modulator driver 122A is connected to the bus 180A and drives the light modulator 112A under the control of the control section 170A.

The light modulator driver 122A produces drive signals that drive the liquid crystal panels on an RGB color basis based on the image data input from the image processing section 155A. Based on the produced RGB drive signals, the light modulator driver 122A drives the liquid crystal panels for the corresponding colors to draw images on the liquid crystal panels.

The projection system 113A includes a lens group that projects the modulated image light fluxes from the light modulator 112A toward the screen SC to form an image on the screen SC. The projection system 113A may further include a zoom mechanism that enlarges or reduces the image to be projected on the screen SC and performs focus adjustment and a focus adjustment mechanism that performs focus adjustment.

The projection system 113A is driven by the projection system driver 123A. The projection system driver 123A includes, for example, motors and drives the motors under the control of the control section 170A to perform zoom and focus adjustment.

The projector 100A includes an operation section. The operation section includes an operation panel 131A, a remote control light receiver 133A, and an input/output I/F section 135A.

The operation panel 131A, which functions as a user interface, is provided with a variety of operation keys and a liquid crystal panel. The input/output I/F section 135A is connected to the operation panel 131A, the remote control light receiver 133A, and the bus 180A. The input/output I/F section 135A, when any of the operation keys thereof is operated, outputs an operation signal corresponding to the operated operation key to the control section 170A. The input/output I/F section 135A causes the liquid crystal panel to display a variety of operation screens under the control of the control section 170A. The operation screens display a variety of buttons via which the projector 100A can be operated.

The remote control light receiver 133A, which receives an infrared signal, receives an infrared signal transmitted from a remote control 5, which functions as a user interface. The remote control light receiver 133A decodes the received infrared signal to produce an operation signal representing the content of the operation performed on the remote control 5 and outputs the operation signal to the control section 170A.

The projector 100A includes an imaging section 140A. The imaging section 140A includes an imaging optical system, an imaging device, such as a charge coupled device (CCD) and a complementary MOS (CMOS) device, and an interface circuit. The imaging device may be configured to be capable of measuring luminance (Y) out of the XYZ tristimulus values or may have a typical configuration that can measure a color component on an RGB color basis. The imaging section 140A performs imaging under the control of the control section 170A along the direction in which the projection system 113A performs projection. The imaging area, that is, the angle of view of the imaging section 140A is the area that covers the screen SC and a portion therearound. The imaging section 140A outputs captured image data that is the result of the imaging to the control section 170A. The imaging section 140A corresponds to the "first imaging section" and the "imaging section" according to an aspect of the invention. The imaging section 140B of the projector 100B corresponds to the "second imaging section" according to an aspect of the invention.

The projector 100A includes a communication I/F section 145A. The communication I/F section 145A corresponds to the "acquisition section" according to an aspect of the invention. The communication I/F section 145A transmits and receives a variety of sets of data to and from the projector 100B under the control of the control section 170A. Control information used to control the projector 100B is transmitted from the projector 100A to the projector 100B. A response to the control information, captured image data captured by the imaging section 140B of the projector 100B, and other pieces of information are transmitted from the projector 100B to the projector 100A.

The present embodiment will be described with reference to a case where the projectors 100A and 100B are connected to each other via a wire, but the communication between the projectors 100A and 100B may be wireless communication, such as a wireless LAN and Bluetooth (registered trademark).

The projector 100A includes an image processing system. The image processing system is primarily formed of the control section 170A, which oversees and controls the entire projector 100A. The image processing system further includes the frame memory 153A, the image processing section 155A, and a storage section 160A. The control section 170A, the image processing section 155A, and the storage section 160A are connected to each other via the bus 180A in a communicable manner.

The frame memory 153A includes a plurality of banks. The banks each have storage capacity into which one-frame image data can be written. The frame memory 153A is formed, for example, of a synchronous dynamic random access memory (SDRAM). An SDRAM is a DRAM that reads and writes data in synchronization with a clock.

The image processing section 155A processes the image data developed in the frame memory 153A. Examples of the processes carried out by the image processing section 155A include a resolution conversion (scaling) process or a resizing process, a distortion correction process, a shape correction process, a digital zooming process, an image color tone adjustment process, and an image luminance adjustment process. The image processing section 155A carries out a process specified by the control section 170A. The image processing section 155A carries out the process by using a parameter inputted from the control section 170A as required. The image processing section 155A can, of course, carry out the combination of a plurality of the processes described above.

The image processing section 155A reads the image data having undergone the process from the frame memory 153A and outputs the image data to the light modulator driver 122A. The image processing section 155A corresponds to the "first image processing section" according to an aspect of the invention. The image processing section 155B of the projector 100B corresponds to the "second image processing section" according to an aspect of the invention.

The image processing section 155A includes a CPU, a ROM, a RAM, and other peripheral circuits (none of them is shown) as hardware. The CPU is a processor that performs computation, and the CPU performs the computation in accordance with the control program stored in the ROM or the storage section 160A. The ROM is a nonvolatile memory and stores, for example, the control program and computation data. The RAM is used as a work area that temporarily stores the control data executed by the processor and the computation data.

The storage section 160A is an auxiliary storage device, for example, a hard disk drive. The storage section 160A can be replaced with a flash memory, an electrically erasable programmable ROM (EEPROM), or any other semiconductor memory, a compact disc (CD), a digital versatile disc (DVD), a Blu-ray (registered trademark) disc (BD), or any other optical disk. The storage section 160A stores a control program executed by the control section 170A, parameters used in the image processing performed by the image processing section 155A, and a variety of other types of data. The storage section 160A further stores image data. The projector 100A reads the image data from the storage section 160A, performs image processing on the image data, and projects the processed image data via the projection section 110A on the screen SC.

The storage section 160A further stores mark image data 161A, first pattern image data 163A, second pattern image data 165A, and a correction function f(n). Similarly, the storage section 160B of the projector 100B stores mark image data 161B, first pattern image data 163B, second pattern image data 165B, and the correction function f(n).

Figure 3:
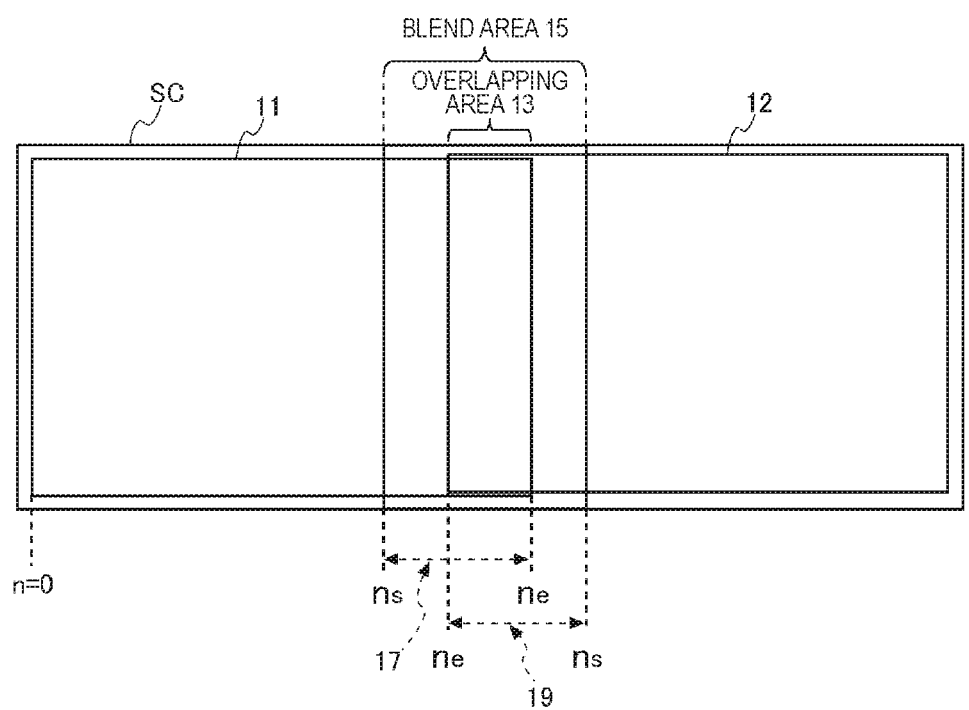
FIG. 3 shows projection areas of a screen.

The mark image data 161A is image data used to identify a first blend area 17 (see FIG. 3). Similarly, the mark image data 161B is image data used to identify a second blend area 19 (see FIG. 3). The first blend area 17 and the second blend area 19 will be described later in detail. The correction function f(n) is a function used to perform edge blending, which will be described later.

The first pattern image data 163A and the second pattern image data 165A are image data used to detect the luminance of the projection areas 11 and 12.

To detect the luminance of the projection area 11, the projector 100A projects an image based on the first pattern image data 163A on the projection area 11, and the projector 100B projects an image based on the second pattern image data 165B on the projection area 12. When the projector 100A projects the image based on the first pattern image data 163A, a white image is projected over the entire projection area 11. When the projector 100B projects the image based on the second pattern image data 165B, a black image is projected over the entire projection area 12. The image based on the first pattern image data 163A corresponds to the "first image" according to an aspect of the invention.

To detect the luminance of the projection area 12, the projector 100A projects an image based on the second pattern image data 165A on the projection area 11, and the projector 100B projects an image based on the first pattern image data 163B on the projection area 12. When the projector 100A projects the image based on the second pattern image data 165A, a black image is projected over the entire projection area 11. When the projector 100B projects the image based on the first pattern image data 163B, a white image is projected over the entire projection area 12. The image based on the first pattern image data 163B corresponds to the "second image" according to an aspect of the invention.

The edge blending and the correction function f(n) will now be described. The edge blending is a process carried out when an image projected by the projector 100A and an image projected by the projector 100B are caused to partially overlap with each other and is the process of making the joint between the overlapping images less visually standing out. Specifically, the edge blending is the process of setting a blend area 15 (see FIG. 3) and adjusting the luminance of the images projected in the set blend area 15 by using the correction function f(n) to make the joint between the overlapping images less visually standing out. The blend area 15 is an area which undergoes the edge blending and where the luminance of the images is adjusted by using the correction function f(n). The blend area 15 may be so set as to coincide with the overlapping area 13 or may be so set as to contain the overlapping area 13. Instead, the blend area 15 may be specified by a user's operation of the operation panel 131A or the remote control 5, or the projector 100A may detect the overlapping area 13 and sets the blend area 15 to be the detected overlapping area 13.

FIG. 3 shows the projection areas 11 and 12 of the screen SC.

In FIG. 3, the area where the projector 100A performs the edge blending is the first blend area 17, and the area where the projector 100B performs the edge blending is the second blend area 19. The blend area 15 includes two areas, the first blend area 17 and the second blend area 19. Part of the first blend area 17 and part of the second blend area 19 coincide with each other.

Coordinates are set in the horizontal direction with the left end of the projection area 11 being the origin (n=0). The coordinate where the edge blending starts is called $n_s$, and the coordinate where the edge blending ends is called $n_e$. When $n_e < n_s$, that is, when the edge blending is performed on the first blend area 17, the correction function f(n) representing the quantity of decrease in the luminance at the coordinate n (hereinafter referred to as luminance decrease quantity) is as follows.

When $0 \le n/M < 0.5$, $$f(n)=\{0.5(2n/M)^p\}^k \quad (1)$$

When $0.5 \le n/M \le 1$, $$f(n)=\{1-0.5(2(1-n/M))^p\}^k \quad (2)$$

When $n_e > n_s$, that is, when the edge blending is performed on the second blend area 19, the correction function f(n) is as follows.

When $0 \le n/M < 0.5$, $$f(n)=1-\{0.5(2n/M)^p\}^k \quad (3)$$

When $0.5 \le n/M \le 1$, $$f(n)=1-\{1-0.5(2(1-n/M))^p\}^k \quad (4)$$

In Expressions (1), (2), (3), and (4) described above, "M" is the result of addition of 1 to the absolute value of the difference between $n_e$ and $n_s$. That is, "M" represents the number of pixels present between the coordinate n, and the coordinate $n_e$. "p" is a coefficient that determines the gradient of the correction function f(n). The coefficient "k" is a luminance adjusting coefficient that determines the brightness of each pixel that forms the images projected in the first blend area 17 and the second blend area 19.

Figure 4:
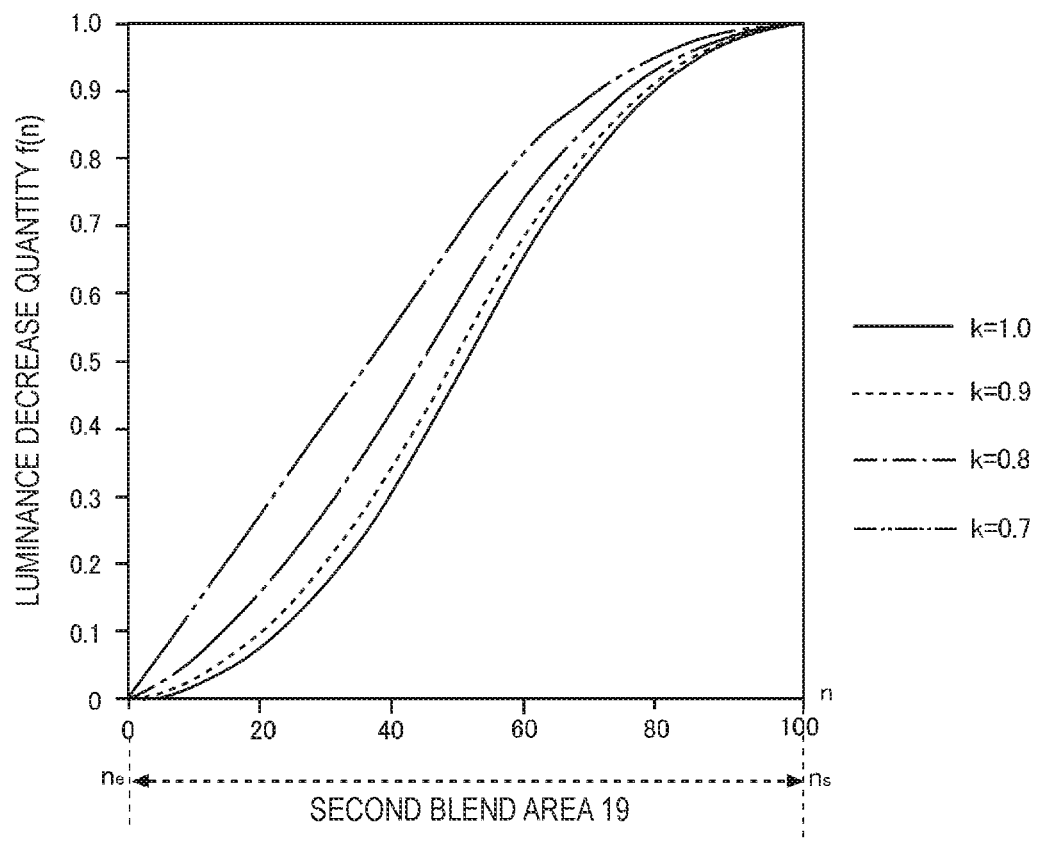
FIG. 4 shows a luminance decrease quantity at each coordinate with a coefficient changed as a parameter.

FIG. 4 shows the luminance decrease quantity at each coordinate with the coefficient "k" changed as a parameter. In particular, FIG. 4 shows graphs representing the luminance decrease quantities at the coordinates n (n ranges from 0 to 100) with the coefficient "k" changed to "1.0," "0.9," "0.8," and "0.7" provided that "$n_e$"=0, "$n_s$"=100, and "p"=2. Since "$n_e$"=0 and "$n_s$"=100, that is, since the start coordinate $n_e$ is on the right of the end coordinate $n_s$, the luminance decrease quantity shown in FIG. 4 corresponds to the luminance decrease quantity in the second blend area 19.

For example, comparison between the curve representing the luminance decrease quantity in the case of "k"=1.0, which is indicated by the solid line in FIG. 4, and the curve representing the luminance decrease quantity in the case of "k"=0.7, which is indicated by the two-dot chain line in FIG. 4, clearly shows that reducing the value of the coefficient "k" increases the luminance decrease quantity, that is, allows the luminance of the image to be lowered.

It is assumed that the projectors 100A and 100B correct the luminance of the images by using the correction function f(n) having the coefficient "k" of 1.0 and "p" of 2 and project the corrected images on the projection areas 11 and 12. In this case, the sum of the luminance decrease quantities in the area where the image projected by the projector 100A and the image projected by the projector 100B overlap with each other (that is, overlapping area 13) is 1.0. Further, it is assumed that the projectors 100A and 100B correct the luminance of the images by using the correction function f(n) having the coefficient "k" of 0.7 and "p" of 2 and project the corrected images on the projection areas 11 and 12. In this case, the sum of the luminance decrease quantities in overlapping area 13, where the image projected by the projector 100A and the image projected by the projector 100B overlap with each other, is greater than 1.0. That is, the luminance decrease quantity in this case is greater than the luminance decrease quantity in the case where the coefficient "k" is 1.0.

The control section 170A includes a CPU, a ROM, a RAM, and other peripheral circuits (none of them is shown) as hardware. The CPU is a processor that performs computation, and the CPU performs the computation in accordance with the control program stored in the ROM or the storage section 160A. The ROM is a nonvolatile memory and stores, for example, the control program and computation data. The RAM is used as a work area that temporarily stores the control data executed by the processor and the computation data. The control section 170A operates as the "computation section" according to an aspect of the invention.

In the present embodiment, the control section 170A includes a single processor (CPU), and the processor carries out processes according to the control program to achieve the functions of the control section 170A. A plurality of processors or semiconductor chips may instead achieve the functions of the control section 170A. For example, the control section 170A may further include a co-processor, such as a System-on-a-Chip (SoC), a micro control unit (MCU), and a field-programmable gate array (FPGA). The control section 170A may cause the CPU and the co-processor to cooperate with each other or may selectively use one of the CPU and the co-processor to perform a variety of types of control.

The control section 170A includes a projection control section 171A, an imaging control section 173A, and a luminance adjustment section 175A as functional blocks. The functional blocks represent for convenience the functions achieved when the CPU performs computation in accordance with the control program in the form of blocks but do not each stand for specific application software or hardware.

The projection control section 171A controls the image processing section 155A and the driver 120A to cause them to project an image on the screen SC. Specifically, the projection control section 171A controls the image processing section 155A to cause the image processing section 155A to process the image data developed in the frame memory 153A. In this process, the projection control section 171A reads a parameter necessary for the image processing section 155A to process the image data from the storage section 160A and outputs the parameter to the image processing section 155A.

The projection control section 171A further controls the light source driver 121A to cause it to turn on the light source of the light source section 111A and adjust the luminance of the light from the turned-on light source. The projection control section 171A still further controls the light modulator driver 122A to cause the liquid crystal panels of the light modulator 112A to draw images. The projection control section 171A further controls the projection system driver 123A to cause it to drive the motors to cause the projection system 113A to perform the zoom and focus adjustment.

The imaging control section 173A controls the imaging section 140A to cause it to produce captured image data. The imaging control section 173A causes the imaging section 140A to perform imaging and acquires captured image data produced by the imaging section 140A. The captured image data produced by the imaging section 140A contains the captured area including the projection area 11. The area including the projection area 11 corresponds to the "area including the first image" according to an aspect of the invention. The imaging control section 173A causes the storage section 160A to store the acquired captured image data.

The imaging control section 173B of the projector 100B controls the imaging section 140B to cause it to produce captured image data. The imaging control section 173B causes the imaging section 140B to perform imaging and acquires captured image data produced by the imaging section 140B. The captured image data produced by the imaging section 140B contains the captured area including the projection area 12. The area including the projection area 12 corresponds to the "area including the second image" according to an aspect of the invention. The imaging control section 173B controls the communication I/F section 145B to cause it to transmit the acquired captured image data to the projector 100A.

The luminance adjustment section 175A performs the edge blending to adjust the luminance of the images projected in the blend area 15.

The luminance adjustment section 175A causes the projector 100A to project an image based on the first pattern image data 163A on the projection area 11 and communicates with the projector 100B to cause the projector 100B to project an image based on the second pattern image data 165B. The luminance adjustment section 175A instructs the imaging control section 173A to cause the imaging section 140A to capture an image of the screen SC with the images projected on the projection areas 11 and 12.

The luminance adjustment section 175A causes the projector 100B to capture an image of the screen SC and acquires the captured image data from the projector 100B.

The luminance adjustment section 175A causes the projector 100A to project an image based on the second pattern image data 165A on the projection area 11 and communicates with the projector 100B to cause the projector 100B to project an image based on the first pattern image data 163B. The luminance adjustment section 175A causes the projector 100B to capture an image of the screen SC with the images projected on the projection areas 11 and 12. The imaging control section 173B of the projector 100B controls the imaging section 140B to cause it to capture an image of the screen SC and transmits the produced captured image data to the projector 100A.

The luminance adjustment section 175A then determines the luminance distribution across the first blend area 17 based on the captured image data produced by the imaging section 140A. The determined luminance distribution is called a first luminance distribution. The luminance adjustment section 175A corrects the determined first luminance distribution by using the correction function f(n) to determine a post-correction luminance distribution. The determined luminance distribution is called a post-correction luminance distribution. Further, the luminance adjustment section 175A changes the value of the coefficient k to change the correction function f(n) and corrects the first luminance distribution by using the changed correction function f(n) to determine a plurality of post-correction luminance distributions.

The luminance adjustment section 175A further determines the luminance distribution across the second blend area 19 based on the captured image data acquired from the projector 100B. The determined luminance distribution is called a second luminance distribution. The luminance adjustment section 175A corrects the determined second luminance distribution by using the correction function f(n) to determine a post-correction luminance distribution. The determined luminance distribution is called a post-correction luminance distribution. Further, the luminance adjustment section 175A changes the value of the coefficient k to change the correction function f(n) and corrects the second luminance distribution by using the changed correction function f(n) to determine a plurality of post-correction luminance distributions.

Further, the luminance adjustment section 175A sums the post-correction luminance distribution across the first blend area 17 and the post-correction luminance distribution across the second blend area 19 to determine the luminance distribution across the blend area 15. The thus determined luminance distribution is called a post-blending luminance distribution. Summing the post-correction luminance distribution across the first blend area 17 and the post-correction luminance distribution across the second blend area 19 allows determination of the luminance distribution across the blend area 15 in the state in which the projector 100A projects the image on the projection area 11 and the projector 100B projects the image on the projection area 12.

The luminance adjustment section 175A changes the combination of post-correction luminance distributions to be summed to determine a plurality of post-blending luminance distributions. Out of the plurality of determined post-blending luminance distributions, the luminance adjustment section 175A selects a luminance distribution that achieves an optimum luminance distribution across the blend area 15. The luminance adjustment section 175A identifies the post-correction luminance distributions summed to calculate the selected post-blending luminance distribution and identifies the coefficients k of the correction function f(n) used to calculate the identified post-correction luminance distributions.

The luminance adjustment section 175A transmits the corresponding one of the identified coefficients k to the projector 100B and causes the projector 100B to perform luminance adjustment using the correction function f(n) having the identified coefficient k. Further, the luminance adjustment section 175A outputs the correction function f(n) having the corresponding one of the identified coefficients k to the image processing section 155A and causes the image processing section 155A to perform image data luminance adjustment using the correction function f(n).

Figure 5:
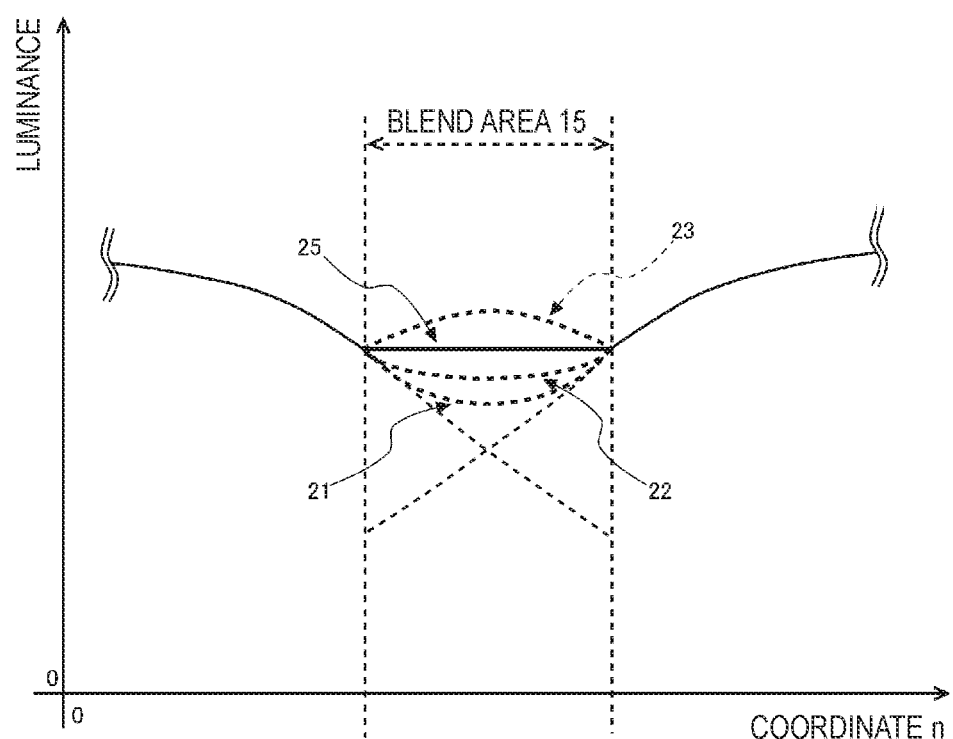
FIG. 5 shows post-blending luminance distributions across a blend area.

FIG. 5 shows the post-blending luminance distribution across the blend area 15.

Curves 21 to 23 drawn with the broken lines in FIG. 5 show a plurality of post-blending luminance distributions determined by changing the combination of post-correction luminance distributions. The straight line 25 drawn with the solid line in FIG. 5 shows an ideal luminance distribution. The luminance adjustment section 175A determines differences between the luminance values of each of the plurality of post-blending luminance distributions and the luminance values of the ideal luminance distribution and selects a post-blending luminance distribution that allows the determined difference to be minimized as the optimum luminance distribution.

Figure 6:
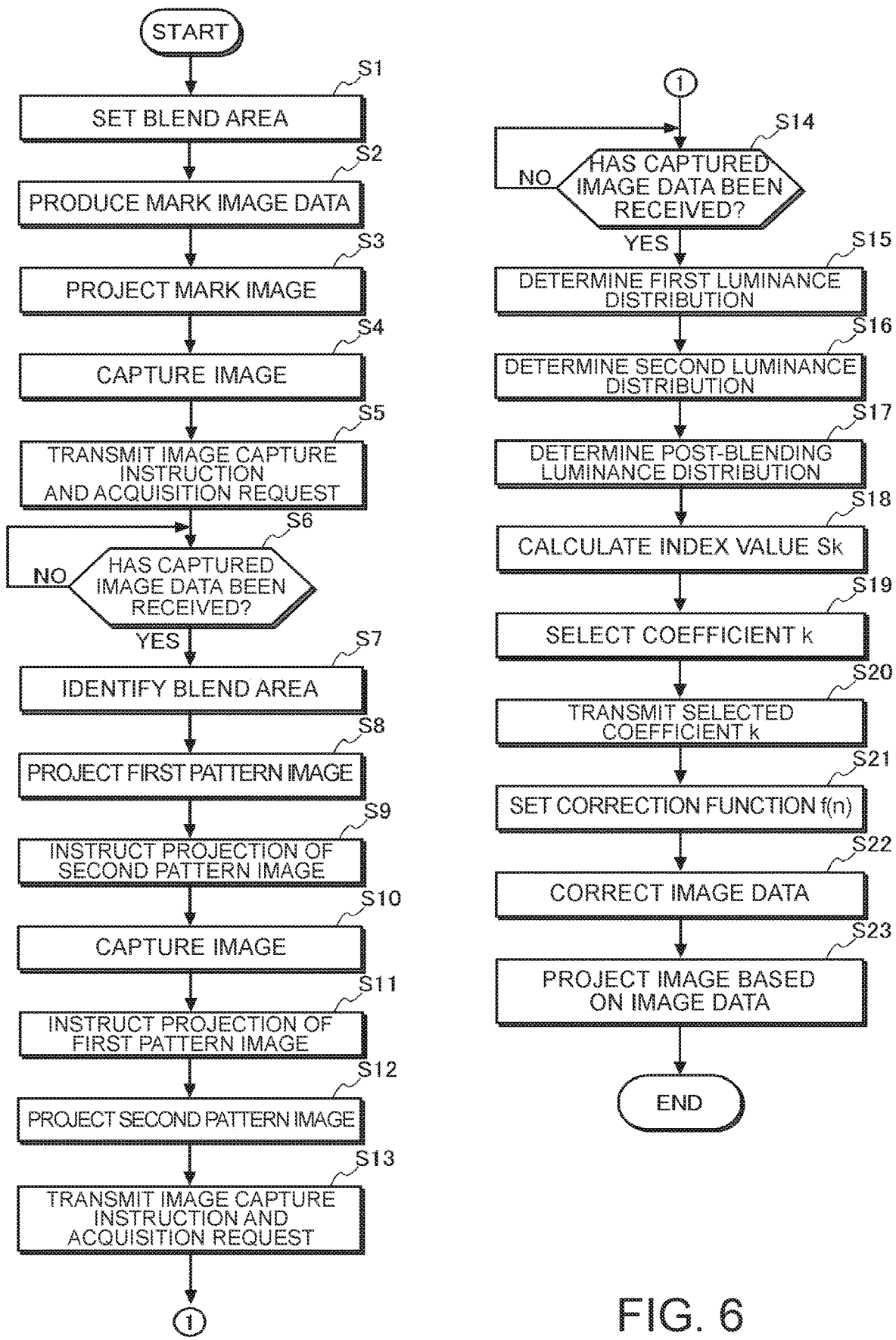
FIG. 6 is a flowchart showing the action of the projector.

FIG. 6 is a flowchart showing the action of the projector 100A.

The control section 170A first accepts settings of the blend area 15 from the operation panel 131A or the remote control 5 (step S1). The user operates the operation panel 131A or the remote control 5 to set, for example, the distance from right end of the projection area 11, which is located in a left portion of the screen SC, and the distance from left end of the projection area 12, which is located in a right portion of the screen SC. The flowchart will be described with reference to the case where the overlapping area 13 is set as the blend area 15.

Having accepted the settings of the blend area 15, the control section 170A causes the storage section 160A to store the accepted setting information and transmits the accepted setting information to the projector 100B. The control section 170A then produces the mark image data 161A in accordance with the setting information (step S2) and causes the storage section 160A to store the produced mark image data 161A.

Figure 7:
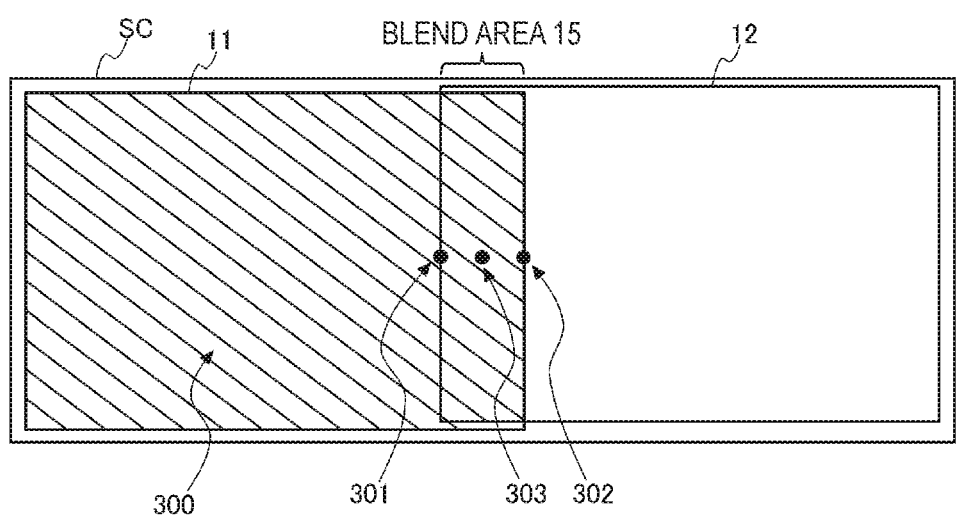
FIG. 7 shows an example of a mark image.

FIG. 7 shows an example of a mark image 300. The mark image 300 is an image projected on the projection area 11 when the projector 100A projects an image based on the mark image data 161A. In FIG. 7, to show the state in which the mark image 300 is projected on the projection area 11, the projection area 11 is hatched. Three marks 301, 302, and 303 are formed in the mark image 300 produced by the control section 170A. FIG. 7 shows black circle images as the marks 301 to 303, and the shape and size of each of the marks 301 to 303 is arbitrarily determined. For example, the marks 301 to 303 may each have a triangular, quadrangular, or any other polygonal shape or may each be "X" or any other symbol.

The marks 301 to 303 are disposed in longitudinally central positions in the mark image 300. The longitudinal positions of the marks 301 to 303 are not limited to the longitudinally central positions, but aligning the longitudinal positions of the marks 301 to 303 with one another eliminates the need to consider a change in the luminance in the longitudinal direction of the screen SC. Another reason why the marks 301 to 303 are disposed in the longitudinally central positions in the mark image 300 is that the luminance is maximized at the center of the screen and setting the luminance decrease quantity with respect to the luminance in the position where the luminance is maximized allows the correction function f(n) to be readily set.

The mark 301 is located at the left end of the overlapping area 13 when viewed from the side facing the screen SC, and the mark 302 is located at the right end of the overlapping area 13 when viewed from the side facing the screen SC. The mark 303 is located at the middle between the marks 301 and 302.

The control section 170A then reads the mark image data 161A from the storage section 160A and causes the projection section 110A to project the mark image 300, which is an image based on the mark image data 161A on the projection area 11 (step S3).

Having caused the projection section 110A to project the mark image 300 on the projection area 11, the control section 170A causes the imaging section 140A to capture an image of the screen SC (step S4). The captured image data produced by the imaging section 140A contains the captured mark image projected on the screen SC. The control section 170A acquires the captured image data from the imaging section 140A and causes the storage section 160A to store the acquired captured image data. The captured image data produced by the imaging section 140A is hereinafter referred to as first captured image data.

The control section 170A then transmits an instruction of capture of an image of the screen SC and a request of acquisition of the produced captured image data to the projector 100B (step S5).

The projector 100B causes the imaging section 140B to capture an image of the screen SC in accordance with the instruction received from the projector 100A to produce captured image data. The projector 100B transmits the produced captured image data to the projector 100A in accordance with the acquisition request.

Having transmitted the acquisition request to the projector 100B, the control section 170A evaluates whether or not captured image data has been received from the projector 100B (step S6). In a case where no captured image data has been received (NO in step S6), the control section 170A does not start the following process but waits until captured image data is received. In a case where captured image data has been received (YES in step S6), the control section 170A causes the storage section 160A to store the received captured image data. The captured image data received from the projector 100B is hereinafter referred to as second captured image data.

The control section 170A then reads the first captured image data from the storage section 160A. The control section 170A analyzes the read first captured image data to detect images of the marks 301, 302, and 303 contained in the first captured image data. The control section 170A identifies the blend area 15 in the first captured image data produced by the imaging section 140A by detecting the images of the marks 301, 302, and 303 (step S7). The control section 170A identifies the coordinates where the images of the marks 301, 302, and 303 are detected or the center coordinates of the coordinates where the images of the marks 301, 302, and 303 are detected as the coordinates of the left end, the right end, and the center of the blend area 15, respectively. The identified coordinates are coordinates in a coordinate system set in the captured image data produced by the imaging section 140A. The control section 170A sets a coordinate system, for example, having an origin defined by the upper left of the first captured image data, an axis X defined by the lateral direction, and an axis Y defined by the longitudinal direction and identifies the coordinates of the left end, the right end, and the center of the blend area 15.

The control section 170A then reads the second captured image data from the storage section 160A and analyzes the read second captured image data, as in the case of the first captured image data, to detect images of the marks 301, 302, and 303. The blend area 15 is thus identified in the second captured image data produced by the imaging section 140B of the projector 100B. The control section 170A identifies the coordinates where the images of the marks 301, 302, and 303 are detected or the center coordinates of the coordinates where the images of the marks 301, 302, and 303 are detected as the coordinates of the left end, the right end, and the center of the blend area 15, respectively. The identified coordinates are coordinates in a coordinate system set in the captured image data produced by the imaging section 140B. The control section 170A sets a coordinate system, for example, having an origin defined by the upper left of the second captured image data, an axis X defined by the lateral direction, and an axis Y defined by the longitudinal direction and identifies the coordinates of the left end, the right end, and the center of the blend area 15.

The control section 170A then reads the first pattern image data 163A from the storage section 160A and causes the projection section 110A to project an image based on the read first pattern image data 163A (called first pattern image) (step S8). In the present embodiment, a white image is projected as the first pattern image on the projection area 11.

The control section 170A then transmits an instruction of projection of the second pattern image data 165B to the projector 100B (step S9). The projector 100B projects an image based on the second pattern image data 165B (called second pattern image) on the projection area 12 in accordance with the projection instruction received from the projector 100A. The present embodiment will be described with reference to a case where the projector 100B projects a black image on the projection area 12. Instead, the light from the light source section 111B provided in the projector 100B may be so blocked that no leakage light exits out of the light source section 111B. For example, the light source of the light source section 111B may be turned off, or a projection lens shutter provided in the projection system 113B may be closed, so that no leakage light exits out of the light source section 111B.

The control section 170A then causes the imaging section 140A to capture an image of the screen SC (step S10). The captured image data produced by the imaging section 140A contains the first pattern image and second pattern image projected on the screen SC. The control section 170A acquires the captured image data from the imaging section 140A and causes the storage section 160A to store the acquired captured image data. The captured image data produced by the imaging section 140A is hereinafter referred to as third captured image data.

The control section 170A then transmits an instruction of projection of the first pattern image to the projector 100B (step S11). The projector 100B projects the first pattern image, which is an image based on the first pattern image data 163B, on the projection area 12 in accordance with the projection instruction. Further, the control section 170A reads the second pattern image data 165A from the storage section 160A and projects the second pattern image, which is an image based on the read second pattern image data 165A, on the projection area 11 (step S12). Further, the control section 170A transmits an instruction of capture of an image of the screen SC and a request of acquisition of the produced captured image data to the projector 100B (step S13).

The projector 100B causes the imaging section 140B to capture an image of the screen SC in accordance with the imaging instruction received from the projector 100A to produce captured image data. The projector 100B transmits the produced captured image data to the projector 100A in accordance with the acquisition request.

Having transmitted the acquisition request to the projector 100B, the control section 170A evaluates whether or not captured image data has been received from the projector 100B (step S14). In a case where no captured image data has been received (NO in step S14), the control section 170A does not start the following process but waits until captured image data is received. In a case where captured image data has been received (YES in step S14), the control section 170A causes the storage section 160A to store the received captured image data. The captured image data received from the projector 100B is hereinafter referred to as fourth captured image data.

The control section 170A then reads the third captured image data from the storage section 160A and determines the first luminance distribution across the first blend area 17 based on the read third captured image data (step S15). The control section 170A further reads the fourth captured image data from the storage section 160A and determines the second luminance distribution across the second blend area 19 based on the read fourth captured image data (step S16).

Steps S15 and S16 will be described in detail. Let $(X_{1L}, Y_{1L})$ be the left-end coordinates of the blend area 15 identified from the first captured image data in step S7, let $(X_{1R}, Y_{1R})$ be the right-end coordinates of the blend area 15, and let $(X_{1C}, Y_{1C})$ be the center coordinates of the blend area 15. Further, in step S7, let $(X_{2L}, Y_{2L})$ be left-end coordinates of the blend area 15 identified from the second captured image data, let $(X_{2R}, Y_{2R})$ be right-end coordinates and let $(X_{2C}, Y_{2C})$ be the center coordinates.

In the following calculation, it is assumed that discrepancies among the coordinates in the vertical direction are sufficiently small and $Y_{1L}=Y_{1C}=Y_{1R}$ is therefore satisfied. Similarly, it is assumed that $Y_{2L}=Y_{2C}=Y_{2R}$.

The control section 170A sets an arbitrary coordinate system (hereinafter referred to as set coordinate) and relates the coordinates in the third captured image data and the coordinates in the fourth captured image data to coordinates among the set coordinates. The reason why the control section 170A is caused to carry out the process described above will be described.

Figure 8:
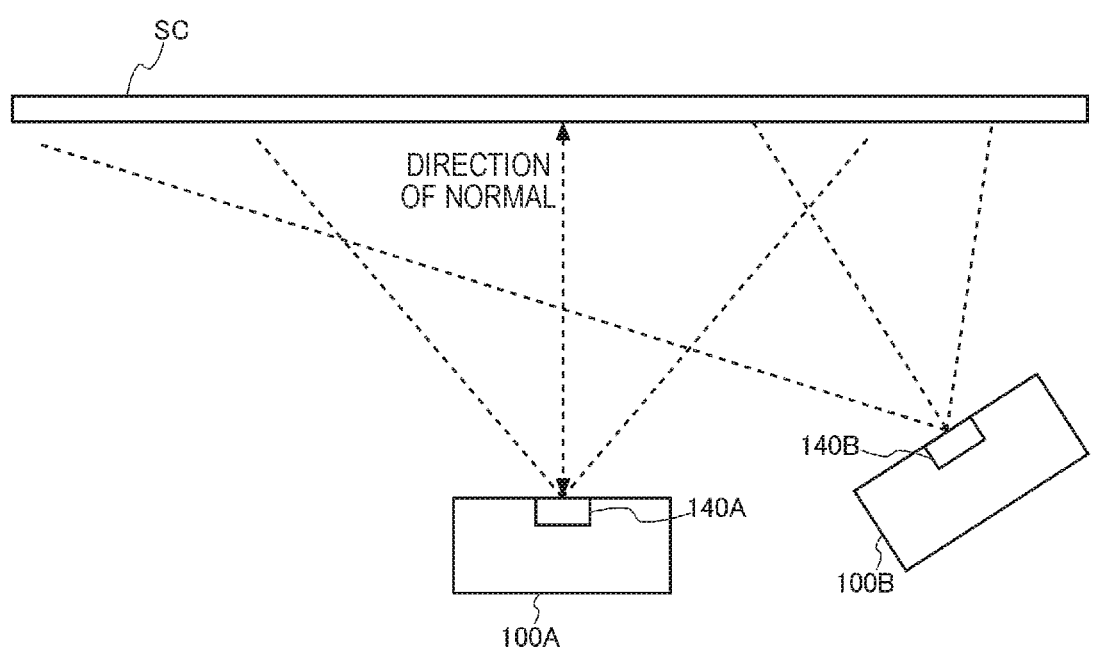
FIG. 8 is a plan view showing the arrangement of the screen and the projectors.

FIG. 8 is a plan view showing the arrangement of the screen SC and the projectors 100A and 100B. The projector 100A and the projector 100B are so installed as to incline by different angles with respect to the screen SC. When the projector 100A and the projector 100B are so installed as to incline by different angles with respect to the screen SC, the following problem occurs: That is, the number of pixels present between the left-end coordinates $(X_{1L}, Y_{1L})$ and the right-end coordinates $(X_{1R}, Y_{1R})$ identified from the first captured image data differs in some cases from the number of pixels present between the left-end coordinates $(X_{2L}, Y_{2L})$ and the right-end coordinates $(X_{2R}, Y_{2R})$ identified from the second captured image data.

For example, it is assumed that the projector 100A is installed at the horizontal center of the screen SC, and that the imaging section 140A performs imaging in the direction parallel to a normal to the screen SC. In this case, the captured image data produced by the imaging section 140A contains the pixels that represent a captured image of the left half of the screen SC and the pixels that represent a captured image of the right half of the screen SC with the numbers of former and latter pixels being roughly the same. In contrast, it is assumed that the projector 100B is so installed as to incline with respect to the normal to the screen SC, and that the imaging section 140B performs imaging in a direction that inclines with respect to the screen SC. In this case, the pixels that form the captured image data produced by the imaging section 140B contains the pixels that represent a captured image of the left half of the screen SC and the pixels that represent a captured image of the right half of the screen SC with the numbers of former and latter pixels being different from each other. The control section 170A therefore sets the set coordinates and relates the pixels in the third captured image data and the pixels in the fourth captured image data to coordinates among the set coordinates. That is, the number of pixels in the third captured image data and the number of pixels in the fourth captured image data are so adjusted as to be equal to each other.

Figure 9:
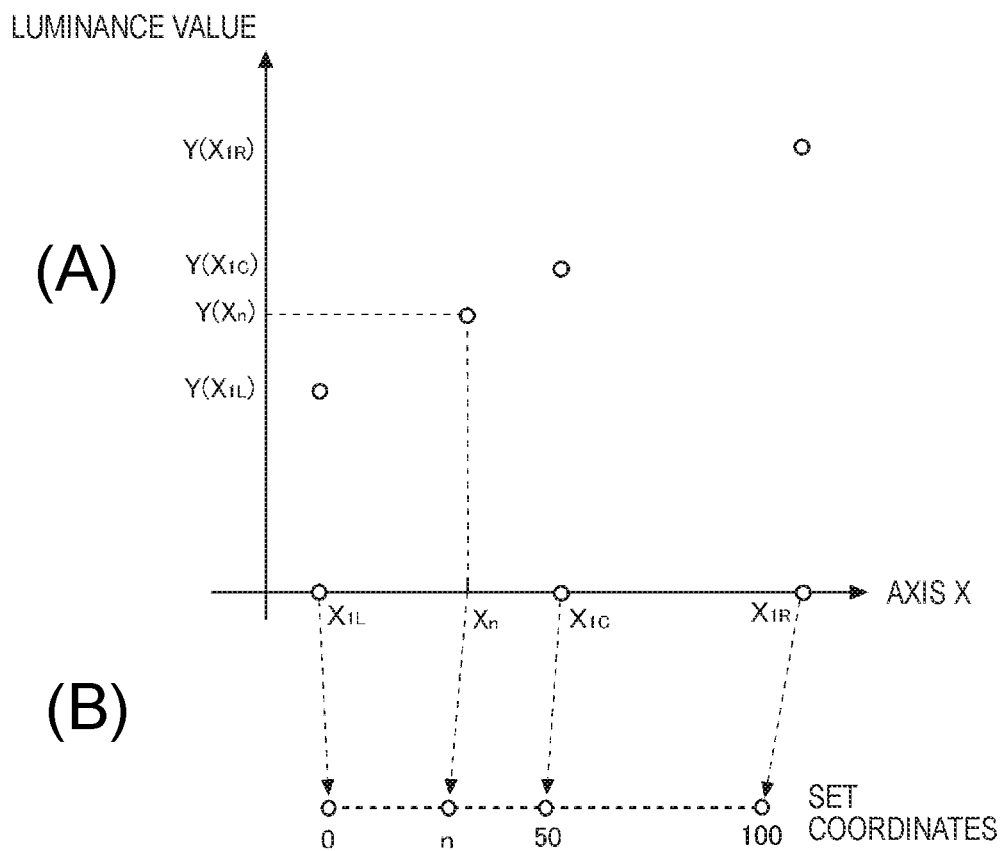
FIG. 9 shows descriptive diagrams for describing coordinate conversion.

FIG. 9 shows descriptive diagrams for describing the coordinate conversion.

(A) in FIG. 9 shows a coordinate system having a horizontal axis that coincides with the axis X of the third captured image data and a vertical axis representing the luminance value. (A) in FIG. 9 further shows luminance values $Y(X_{1L})$, $Y(X_{1C})$, and $Y(X_{1R})$ at the left-end coordinate $X_{1L}$, the center coordinate $X_{1C}$, and the right-end coordinate $X_{1R}$. (B) in FIG. 9 shows the set coordinates.

In the present embodiment, 101 coordinates from a coordinate n=0 to a coordinate n=100 are set as the set coordinates. The control section 170A determines a coordinate Xn in the third captured image data that corresponds to a set coordinate n (integer that satisfies 0≤n≤100) among the set coordinates based on coordinate conversion using a compound ratio. The coordinate Xn in the third captured image data can be determined by the following Expression (5).

$$\frac{n-0}{n-50} : \frac{100-0}{100-50} = \frac{Xn-X_L}{Xn-Xc} : \frac{X_R-X_L}{X_R-Xc} \quad (5)$$

Figure 10:
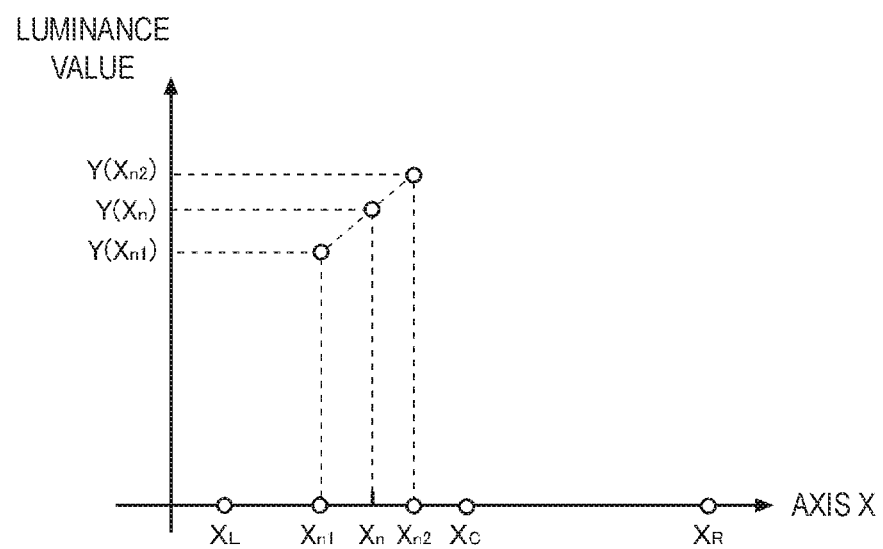
FIG. 10 is a descriptive diagram for describing linear interpolation.

-continued $$Xn = \frac{X_L - A \times X_c}{1 - A}$$

where $A = \frac{n-0}{n-50} \times \frac{100-50}{100-0} \times \frac{X_R - X_L}{X_R - X_C}$ FIG. 10 is a descriptive diagram for describing linear interpolation. FIG. 10 shows a coordinate system having a horizontal axis that coincides with the axis X of the third captured image data and a vertical axis representing the luminance value.

The control section 170A then determines the luminance value at the coordinate Xn by using linear interpolation. Let $Y_1(n)$ be a luminance value determined from the first luminance distribution across the first blend area 17, and the luminance value at the coordinate Xn is expressed by the following Expression (6)

$$Y_1(n) = Y(X_{n1}) + (Xn - X_{n1}) \times \frac{Y(X_{n2}) - Y(X_{n1})}{X_{n2} - X_{n1}} \quad (6)$$

In Expression (6) described above, Xn1 is an X coordinate equal to Xn with the numbers beyond the decimal point truncated. Xn2 is an X coordinate equal to Xn1 to which 1 is added. The control section 170A changes the value of n from 0 to 100 to determine luminance values $Y_1(0)$ to $Y_1(100)$ at the coordinates n from 0 to 100 in the arbitrary coordinate system.

The control section 170A processes the fourth captured image data in the same manner, that is, determines a coordinate Xn in the fourth captured image data that corresponds to a set coordinate n (integer that satisfies 0≤n≤100) among the set coordinates based on Expression (5) described above. Further, let $Y_2(n)$ be a luminance value determined from the second luminance distribution across the second blend area 19, and the control section 170A determines the luminance value at the coordinate Xn by using linear interpolation.

The control section 170A then multiplies the luminance value $Y_1(n)$ by the correction function f(n) to determine a post-correction luminance distribution across the first blend area 17. The post-correction luminance distribution is determined by the following Expression (7).

$$Y_{k1}(n) = Y_1(n) \times f_{k1}(n) \quad \text{Expression (7)}$$

In Expression (7), $f_{k1}(n)$ is a correction function with the coefficient k changed over a range of 0.7≤k≤1.0 provided that $n_e$=100, $n_s$=0, and p=2.

The control section 170A then multiplies the luminance value $Y_2(n)$ by the correction function f(n) to determine a post-correction luminance distribution across the second blend area 19. The post-correction luminance distribution across the second blend area 19 is determined by the following Expression (8).

$$Y_{k2}(n) = Y_2(n) \times f_{k2}(n) \quad \text{Expression (8)}$$

In Expression (8), $f_{k2}(n)$ is a correction function with the coefficient k changed over the range of 0.7≤k≤1.0 provided that $n_e$=0, $n_s$=100, and p=2.

The control section 170A then sums the post-correction luminance distribution across the first blend area 17 and the post-correction luminance distribution across the second blend area 19 to determine a post-blending luminance distribution (step S17). Summing the post-correction luminance distribution across the first blend area 17 and the post-correction luminance distribution across the second blend area 19 allows determination of the post-blending luminance distribution. Let $Y_k(n)$ be the post-blending luminance distribution, and the post-blending luminance distribution $Y_k(n)$ is determined by the following Expression (9).

$$Y_k(n) = Y_{k1}(n) + Y_{k2}(n) \quad (9)$$

The control section 170A then defines an ideal line g(x) in the blend area 15. In the present embodiment, the control section 170A sets the ideal line g(x) to be the straight line that connects the luminance value $Y(X_L)$ at the left end of the blend area 15 to the luminance value $Y(X_R)$ at the right end of the blend area 15. The control section 170A sets the luminance value $Y(X_L)$ to be the luminance value of the pixel corresponding to the left end of the blend area 15 and located at the center in the longitudinal direction out of the pixels that form the first captured image data. Similarly, the control section 170A sets the luminance value $Y(X_R)$ to be the luminance value of the pixel corresponding to the right end of the blend area 15 and located at the center in the longitudinal direction out of the pixels that form the second captured image data.

The control section 170A then determines an index value $S_k$, which represents the difference between the luminance distribution $Y_k(n)$ determined by Expression (9) and the ideal line g(x) (step S18). The index value $S_k$ is determined by the following Expression (10).

$$S_k = \left\{ \int_{X_L}^{X_R} (Y_k(x) - g(x))^2 dx \right\}^{1/2} \quad (10)$$

In Expression (10), $X_R$ represents the X coordinate at the right end of the blend area 15, and $X_L$ represents the X coordinate at the left end of the blend area 15.

Having determined the index value $S_k$, the control section 170A changes the value of the coefficient k over the range of 0.7≤k≤1.0 and selects the value of the coefficient k that minimizes the index value $S_k$ (step S19). The coefficient k corresponds to the "first luminance adjustment information representing a change in luminance" and "second luminance adjustment information representing a change in luminance" in an aspect of the invention.

Having selected the value of the coefficient k, the control section 170A transmits the selected value of the coefficient k to the projector 100B (step S20). The control section 170A sets the correction function f(n) by using the determined coefficient k (step S21). The control section 170A outputs the set correction function f(n) to the image processing section 155A. The image processing section 155A corrects the luminance of the image data by using the correction function f(n) inputted from the control section 170A (step S22) and outputs the corrected image data to the light modulator driver 122A. The light modulator driver 122A produces drive signals that drive the liquid crystal panels on an RGB color basis based on the inputted image data. Based on the produced drive signals, the light modulator driver 122A drives the liquid crystal panels for the corresponding colors to draw images on the liquid crystal panels. An image with the luminance in the blend area 15 corrected is thus projected on the projection area 11 of the screen SC (step S23).

The projector 100B sets the correction function f(n) by using the coefficient k received from the projector 100A and causes the image processing section 155B to correct the luminance of the image data by using the set correction function f(n). The light modulator driver 122B then drives the liquid crystal panels based on the corrected image data to draw images on the liquid crystal panels. An image with the luminance in the blend area 15 corrected is thus projected on the projection area 12 of the screen SC.

Figure 11:
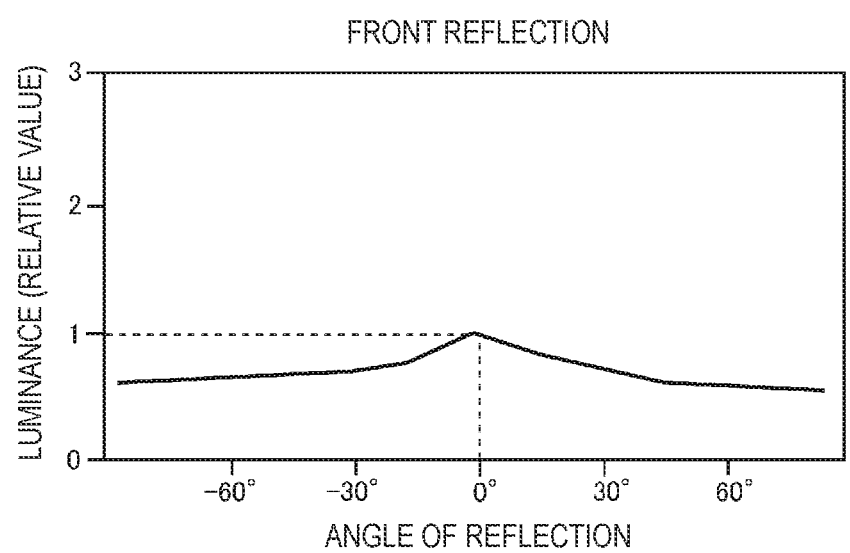
FIG. 11 shows a screen characteristic.
Figure 12:
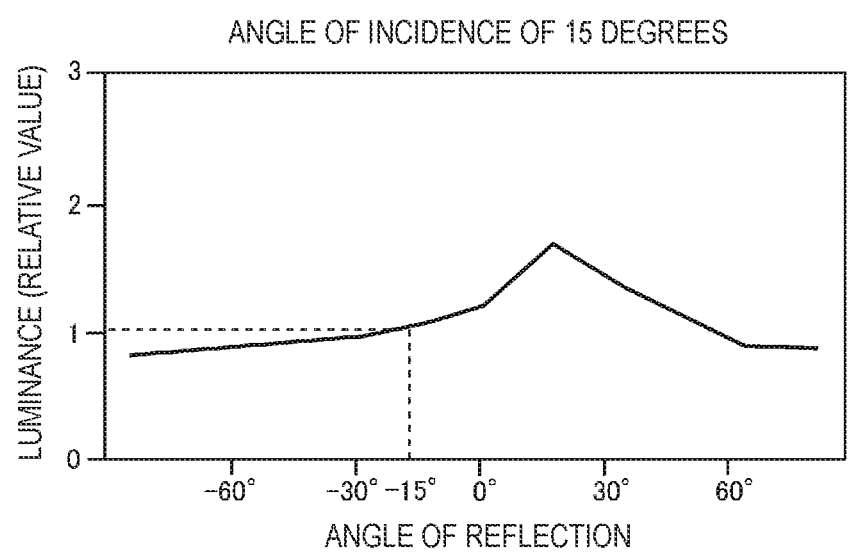
FIG. 12 shows a screen characteristic.
Figure 13:
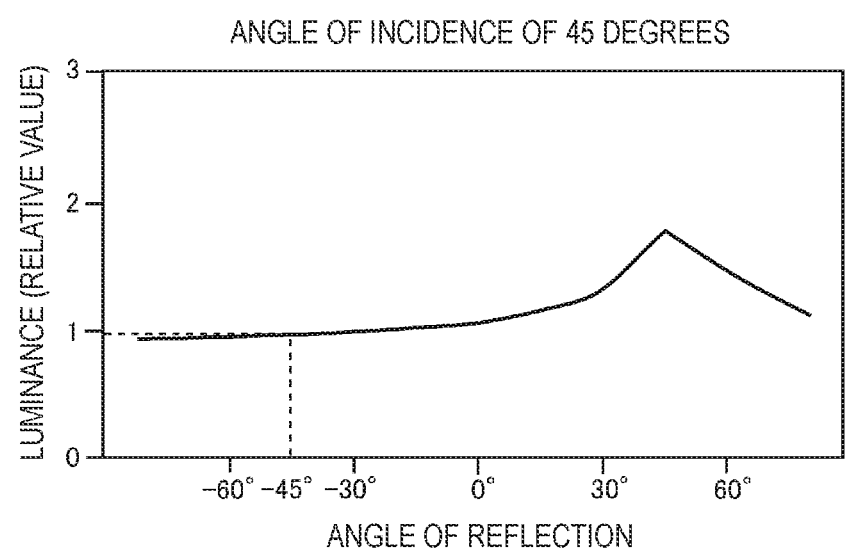
FIG. 13 shows a screen characteristic.

The reason why the luminance distribution across the projection area 11 and the luminance distribution across the projection area 12 are determined from captured image data produced by the separate imaging sections 140A and 140B will next be described with reference to FIGS. 11 to 13. FIGS. 11 to 13 show a screen characteristic. The screen characteristic is a reflection characteristic of the screen SC, which reflects light incident thereon, and is expressed by the intensity of the light according to the direction in which the light is reflected.

FIG. 11 relates to a case where one of the projectors 100 installed in front of the screen SC projects image light and shows the relationship between the angle of reflection at which the light is reflected and a relative luminance value. FIG. 12 relates to a case where the image light outputted from the projector 100 is incident on the screen SC at 15 degrees and shows the relationship between the angle of reflection at which the image light is reflected and the relative luminance value. FIG. 13 relates to a case where the angle of incidence is 45 degrees, that is, the image light outputted from the projector 100 is incident on the screen SC at 45 degrees and shows the relationship between the angle of reflection at which the image light is reflected and the relative luminance value.

A description will be first made of a case where the imaging section 140 of one of the projectors 100 captures an image of the screen SC to determine the luminance distributions across the projection areas 11 and 12. For example, it is assumed that the projector 100B projects image light on the projection area 12, and that the imaging section 140A of the projector 100A captures and measures the intensity distribution of the light reflected off the projection area 12. The screen SC has the screen characteristic, and the luminance distribution across the screen SC varies depending on the viewing position. The luminance distribution of the reflected light captured by the imaging section 140B of the projector 100B therefore does not coincide with the luminance distribution of the reflected light captured by the imaging section 140A of the projector 100A. Therefore, when the imaging section 140A of the projector 100A determines the luminance distribution across the projection area 12, on which the projector 100B projects an image, the luminance distribution across the projection area 12 cannot accurately be determined.

A description will next be made of a case where the imaging section 140A of the projector 100A determines the luminance distribution across the projection area 11, and the imaging section 140B of the projector 100B determines the luminance distribution across the projection area 12.

It is assumed that one of the projectors 100 is installed in a position corresponding to the horizontal center of the screen SC, and that the projector 100 projects image light on the screen SC at an angle of incidence of 0 degrees with respect to the screen SC. The projection is called front projection. FIG. 11 shows the luminance distribution obtained when the imaging section 140 captures the image light outputted from the projector 100 and reflected off the screen SC. The relative luminance value of the image light reflected at an angle of reflection of 0 degrees is close to "1", as shown in FIG. 11. That is, luminance roughly equal to the luminance of the incident light outputted toward the screen SC is achieved.

It is assumed that one of the projectors 100 is so installed that the image light outputted from the projector 100 is projected on the screen SC at the angle of incidence of 15 degrees with respect to the screen SC. FIG. 12 shows the luminance distribution obtained when the imaging section 140 captures the image light outputted from the projector 100 and reflected off the screen SC. The luminance of the reflected light captured in the position where the projector 100 is installed {position where angle of incidence≈–angle of reflection (angle of imaging)} is close to the relative luminance value "1", which is the value in the case of the front projection, as shown in FIG. 12. That is, even when the projector 100 is so installed that the image light is projected on the screen SC at the angle of incidence of 15 degrees with respect to the screen SC, luminance roughly equal to the luminance in the case of the front projection can be measured by the imaging section 140.

FIG. 13 relates to a case where one of the projectors 100 is so installed that the image light outputted from the projector 100 is projected on the screen SC at the angle of incidence of 45 degrees with respect to the screen SC and shows the luminance distribution obtained when the imaging section 140 captures the image light reflected off the screen SC. The luminance of the reflected light captured in the position where the projector 100 is installed {position where angle of incidence≈–angle of reflection (angle of imaging)} is close to the relative luminance value "1", which is the value in the case of the front projection, as shown in FIG. 13. That is, even when the projector 100 is so installed that the image light is projected on the screen SC at the angle of incidence of 45 degrees with respect to the screen SC, luminance having a value roughly equal to the relative luminance value in the case of the front projection can be measured by the imaging section 140.

Determining the luminance distribution across the projection area 11 by using the imaging section 140A and determining the luminance distribution across the projection area 12 by using the imaging section 140B as described above provide the following advantages.

That is, in the case of the screen characteristic of many typical screens SC, the luminance value of light that satisfies the angle of incidence≈–the angle of reflection is close to the value in the case of the front projection (angle of reflection=0 degrees), whereby a luminance distribution close to that in the front projection can be measured.

Further, the relationship of the angle of incidence of light≈–the angle of reflection of light is achieved irrespective of the angles at which the projectors 100A and 100B are installed with respect to the screen SC, whereby the luminance distribution can be stably measured irrespective of the conditions under which the projectors 100 are installed.

As described above, the present embodiment relates to the image projection system 1 including the projector 100A as the first projector and the projector 100B as the second projector.

The projector 100A includes the projection section 110A, which projects an image on the screen SC, and the imaging section 140A, which captures an image of the screen SC over an area including the image projected by the projection section 110A.

The projector 100B includes the projection section 110B, which projects an image on the screen SC, and the imaging section 140B, which captures an image of the screen SC over a range including the image projected by the projection section 110B.

The projector 100A further includes the control section 170A, which operates as the computation section. The control section 170A determines the luminance distribution across the projection area 11 based on captured image data on an image of the projection area 11, on which the projection section 110A performs projection, and determines the luminance distribution across the projection area 12 based on captured image data on an image of the projection area 12, on which the projection section 110B performs projection.

The control section 170A sets the value of the coefficient "k" used to adjust the luminance of the image projected by the projector 100A based on the luminance distribution across the projection area 11 and the luminance distribution across the projection area 12. The control section 170A further sets the value of the coefficient "k" used to adjust the luminance of the image projected by the projector 100B based on the luminance distribution across the projection area 11 and the luminance distribution across the projection area 12.

According to the configuration described above, an image of the projection area 11 is captured by the imaging section 140A and the luminance distribution across the projection area 11 is determined, and an image of the projection area 12 is captured by the imaging section 140B and the luminance distribution across the projection area 12 is determined. The luminance distributions across the projection areas 11 and 12 can therefore be determined with precision.

In particular, in a case where the reflection characteristic of the screen SC that the luminance of light reflected off the screen SC in roughly the same direction as the direction in which the light is incident on the screen SC is roughly equal to the luminance of light incident on the screen SC at the angle of incidence of 0 degrees and reflected off the screen SC at the angle of reflection of 0 degrees, a luminance distribution close to the luminance distribution in the case of the front projection can be obtained. An error of an imaging result resulting from the reflection characteristic of the screen SC can therefore be suppressed, whereby the luminance of an image can be adjusted with precision.

The control section 170A further determines the coefficient "k" for adjustment of the luminance of the overlapping area 13, where an image projected by the projector 100A overlaps with an image projected by the projector 100B.

The luminance of the overlapping area 13 can therefore be adjusted.

The control section 170A further determines the coefficient "k" representing a luminance change corresponding to the overlapping area 13.

The control section 170A can therefore determine the coefficient "k" used to adjust the luminance of an image projected by the projector 100A and located in the area corresponding to the overlapping area 13 and the coefficient "k" used to adjust the luminance of an image projected by the projector 100B and located in the area corresponding to the overlapping area 13.

The projector 100A further includes the image processing section 155A, which adjusts the luminance of an image projected by the projection section 110A based on the coefficient "k" determined by the control section 170A. The projector 100B further includes the image processing section 155B, which adjusts the luminance of an image projected by the projection section 110B based on the coefficient "k" determined by the projector 100A.

The projector 100A can therefore adjust the luminance of an image projected on the projection area 11 based on the coefficient "k". Further, the projector 100B can adjust the luminance of an image projected on the projection area 12 based on the coefficient "k".

The control section 170A of the projector 100A functions as the computation section. The control section 170A determines the coefficient "k" used to adjust the luminance of the overlapping area 13 out of an image projected by the projector 100A and the coefficient "k" used to adjust the luminance of the overlapping area 13 out of an image projected by the projector 100B. The projector 100A can therefore operate as the master projector.

Second Embodiment

A second embodiment of the invention will be described.

The configurations of the projectors 100A and 100B according to the present embodiment are the same as those in the first embodiment described above. The configurations of the projectors 100A and 100B will therefore not be described.

In the first embodiment described above, to identify the coefficient k and the correction functions f(n), a post-blending luminance distribution closest to the ideal line g(x) is identified from post-blending luminance distributions corrected by a plurality of correction functions f(n) prepared in advance.

In the second embodiment, an ideal correction function f(n) is determined.

The procedure for calculating the luminance values $Y_1(n)$ and $Y_2(n)$ based on Expression (6) described above and the preceding procedures are the same as those in the first embodiment described above and will therefore not be described.

In the present embodiment, an ideal correction function is determined from the luminance value determined by Expression (6). A correction function $h_1(n)$, which corrects the luminance of an image projected by the projector 100A, is determined by the following Expression (11).

$$h_1(n) = f_{11}(n) \times Y_1(0)/Y_1(n) \quad (11)$$

$f_{11}(n)$ represents the correction function expressed by Expression (1) described above provided that the start coordinate $n_s=0$, the end coordinate $n_e=100$, p=2, and k=1. $Y_1(0)$ is the luminance value at the start coordinate $n_s=0$, and $Y_1(n)$ is the luminance value at the coordinate n. $Y_1(0)/Y_1(n)$ is the reciprocal of the ratio of the luminance value $Y_1(n)$ at the coordinate n to the luminance value $Y_1(0)$ at the start coordinate $n_s=0$, that is, $Y_1(0)/Y_1(n)$ corresponds to an increase quantity by which the luminance value is increased.

A correction function $h_2(n)$, which corrects the luminance in the second blend area 19, is similarly determined by the following Expression (12).

$$h_2(n) = f_{12}(n) \times Y_2(100)/Y_2(n) \quad (12)$$

$f_{12}(n)$ represents the correction function expressed by Expression (2) described above provided that the start coordinate $n_s=100$, the end coordinate $n_e=0$, p=2, and k=1. $Y_2(0)$ is the luminance value at the end coordinate $n_e=0$, and $Y_2(n)$ is the luminance value at the coordinate n. $Y_2(100)/Y_2(n)$ is the reciprocal of the ratio of the luminance value $Y_2(n)$ at the coordinate n to the luminance value $Y_2(100)$ at the start coordinate $n_s=100$, that is, $Y_2(100)/Y_2(n)$ corresponds to an increase quantity by which the luminance value is increased.

Having determined the correction functions $h_1(n)$ and $h_2(n)$, the control section 170A transmits the determined correction function $h_2(n)$ to the projector 100B. The projector 100A then outputs the correction function $h_1(n)$ to the image processing section 155A. The image processing section 155A corrects the luminance of the image data by using the correction function $h_1(n)$ inputted from the control section 170A and outputs the corrected image data to the light modulator driver 122A. The light modulator driver 122A produces drive signals that drive the liquid crystal panels on an RGB color basis based on the inputted image data. Based on the produced drive signals, the light modulator driver 122A drives the liquid crystal panels for the corresponding colors to draw images on the liquid crystal panels. An image with the luminance in the blend area 15 corrected is thus projected on the projection area 11 of the screen SC.

Having received the correction function $h_2(n)$ from the projector 100A, the projector 100B outputs the received correction function $h_2(n)$ to the image processing section 155B. The image processing section 155B corrects the luminance of the image data received from the image input I/F section 151B by using the correction function $h_2(n)$ and outputs the corrected image data to the light modulator driver 122B. The light modulator driver 122B produces drive signals that drive the liquid crystal panels on an RGB color basis based on the inputted image data. Based on the produced drive signals, the light modulator driver 122B drives the liquid crystal panels for the corresponding colors to draw images on the liquid crystal panels. An image with the luminance in the blend area 15 corrected is thus projected on the projection area 12 of the screen SC.

As described above, the image projection system 1 according to the second embodiment can also adjust the luminance of images projected by the projectors 100A and 100B with precision, as the image projection system 1 according to the first embodiment.

The first and second embodiments described above and variations thereof are preferable embodiments of the invention. The invention is, however, not limited thereto, and a variety of variations are conceivable to the extent that the variations do not depart from the substance of the invention.

For example, in the first and second embodiments described above, images of the projection areas 11 and 12 are captured for acquisition of captured image data, and the coefficient k of the correction function f(n), which is used to preferably correct the luminance of images projected on the projection areas 11 and 12, is determined based on the acquired captured image data. As a variation, the luminance of the first pattern image data 163A is corrected by using the correction function f(n), and an image based on the first pattern image data 163A having the corrected luminance is projected on the projection area 11. The image is then captured by the imaging section 140A for determination of the luminance distribution across the projection area 11. The process described above is repeated multiple times with the value of the coefficient k of the correction function f(n) changed. The projector 100B also carries out the same processes for the projection area 12. The value of the coefficient k of an optimum correction function f(n) may then be determined based on the luminance distribution determined from the plurality of sets of captured image data.

The above-mentioned first and second embodiments have been described with reference to the case where the storage section 160A stores the correction function f(n) and the luminance of image data is corrected by using the correction function f(n). As a variation, the storage sections 160A and 160B may store a correction value representing the value of the correction function f(n) whenever the coefficient k is changed.

The above-mentioned embodiments have been described with reference to the case where the projector 100A operates as the master projector, and the projector 100B can instead operate as the master projector. Further, the process of determining an optimum coefficient k described with reference to the flowchart shown in FIG. 6 is not necessarily carried out by the control section 170A of the projector 100A and may instead be carried out by an apparatus other than those in the image projection system 1, such as a personal computer.

The process units in the flowchart shown in FIG. 6 are process units divided in accordance with the contents of the primary processes for ease of understanding of the processes carried out by the control section 170A of the projector 100A. How to produce the divided process units or the names of the process units shown in FIG. 6 do not limit the embodiments of the invention. A process carried out by the control section 170A can be further divided into a larger number of process units in accordance with the content of the process, and each of the process units can further be divided into a large number of processes. Further, the order in which the processes are carried out in the flowchart described above is not limited to that shown in FIG. 6.

Each of the functional portions of the projectors 100A and 100B shown in FIG. 2 represents a functional configuration achieved by cooperation between hardware and software and is not necessarily implemented in a specific form. Therefore, hardware corresponding to each of the functional portions is not necessarily implemented, and a single processor that executes a program can, of course, achieve the functions of the plurality of functional portions. Further, part of the functions achieved by software in the embodiments described above may be achieved by hardware, or part of the functions achieved by hardware may be achieved by software.

The above-mentioned first and second embodiments have been described with reference to the case where the projectors 100A and 100B are each a liquid crystal projector using a transmissive liquid crystal panels. The projectors 100A and 100B may instead each be a projector using reflective liquid crystal panels or digital mirror devices.

What is claimed is:

1. An image projection system comprising:
a processor;
a first projector; and
a second projector,
wherein the first projector includes
a first light modulator that projects a first image on a projection surface, and
a first image sensor that captures an image of an area including the first image projected by the first light modulator,
the second projector includes
a second light modulator that projects a second image on the projection surface, and
a second image sensor that captures an image of an area including the second image projected by the second light modulator, and
the processor is programmed to
determine an overlap area based on the image captured by the first image sensor and the image captured by the second image sensor,
set a blend area that includes the overlap area and is equal to or larger than the overlap area,
determine a first luminance distribution of the first image from the image captured by the first image sensor,
determine a second luminance distribution of the second image from the image captured by the second image sensor, determine a plurality of post-blending luminance distributions based on the first luminance distribution and the second luminance distribution, and determine first luminance adjustment information to adjust luminance of the first image, and second luminance adjustment information to adjust luminance of the second image, based on (i) the blend area, (ii) an ideal luminance distribution, and (iii) one of the plurality of post-blending luminance distributions.

2. The image projection system according to claim 1, wherein the processor is programmed to determine the first luminance adjustment information and the second luminance adjustment information representing a luminance change corresponding to the overlap area.

3. The image projection system according to claim 1, wherein the first projector adjusts the luminance of the first image projected by the first light modulator based on the first luminance adjustment information, and the second projector adjusts the luminance of the second image projected by the second light modulator based on the second luminance adjustment information.

4. The image projection system according to claim 1, wherein the first projector includes the processor.

5. The image projection system according to claim 1, wherein the blend area is larger than the overlap area.

6. A projector connected to an external projector, the projector comprising:

a light modulator that projects a first image;

an image sensor that captures an image of an area including the first image projected by the light modulator;

a communication interface that acquires a captured image produced by the external projector and containing an area including a second image projected by the external projector; and a processor programmed to determine an overlap area based on the image captured by the image sensor and the captured image acquired by the communication interface, set a blend area that includes the overlap area and is equal to or larger than the overlap area, determine a first luminance distribution of the first image from the image captured by the first image sensor, determine a second luminance distribution of the second image from the image captured by the second image sensor, determine a plurality of post-blending luminance distributions based on the first luminance distribution and the second luminance distribution, and determine first luminance adjustment information to adjust luminance of the first image, and second luminance adjustment information to adjust luminance of the second image, based on (i) the blend area, (ii) an ideal luminance distribution, and (iii) one of the plurality of post-blending luminance distributions.

7. The projector according to claim 6, wherein the processor is further programmed to output the second luminance adjustment information to the external projector.

8. The projector according to claim 6, wherein the blend area is larger than the overlap area.

9. A method for controlling an image projection system including a first projector and a second projector, the method comprising:

causing the first projector to project a first image and causing the second projector to project a second image;

causing the first projector to capture an image of an area including the first image projected by the first projector;

causing the second projector to capture an image of an area including the second image projected by the second projector;

determining an overlap area based on the image captured by the first projector and the image captured by the second projector, setting a blend area that includes the overlap area and is equal to or larger than the overlap area, determining a first luminance distribution of the first image from the image captured by the first image sensor, determining a second luminance distribution of the second image from the image captured by the second image sensor, determining a plurality of post-blending luminance distributions based on the first luminance distribution and the second luminance distribution, and determining first luminance adjustment information to adjust luminance of the first image, and second luminance adjustment information to adjust luminance of the second image, based on (i) the blend area, (ii) an ideal luminance distribution, and (iii) one of the plurality of post-blending luminance distributions.

10. The image projection system according to claim 1, wherein the processor is further programmed to output the second luminance adjustment information to the second projector.

11. The method of claim 9, wherein the first projector determines the overlap area, the first projector sets the blend area, the first projector determines the first luminance adjustment information and the second luminance adjustment information, and the first projector outputs the second luminance adjustment information to the second projector.

12. The method of claim 9, wherein the blend area is larger than the overlap area.

* * * * *